United States Patent
Heuler et al.

(10) Patent No.: US 8,572,564 B2
(45) Date of Patent: Oct. 29, 2013

(54) CONFIGURING AND CONSTRUCTING APPLICATIONS IN A MAINFRAME-BASED COMPUTING ENVIRONMENT

(75) Inventors: Randal J. Heuler, McMurray, PA (US); Duane K. Crilley, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 1170 days.

(21) Appl. No.: 12/248,403

(22) Filed: Oct. 9, 2008

(65) Prior Publication Data

US 2009/0100402 A1 Apr. 16, 2009

Related U.S. Application Data

(60) Provisional application No. 60/979,499, filed on Oct. 12, 2007.

(51) Int. Cl.
*G06F 9/44* (2006.01)

(52) U.S. Cl.
USPC .......................................................... 717/121

(58) Field of Classification Search
None
See application file for complete search history.

(56) References Cited

U.S. PATENT DOCUMENTS

| | | | | |
|---|---|---|---|---|
| 6,738,975 B1 * | 5/2004 | Yee et al. | ...................... | 719/310 |
| 6,817,008 B2 * | 11/2004 | Ledford et al. | .............. | 717/102 |
| 7,007,266 B1 * | 2/2006 | Isaacson | ...................... | 717/100 |
| 7,437,703 B2 * | 10/2008 | Wu | ............................... | 717/100 |
| 7,557,707 B2 * | 7/2009 | Kumar et al. | .............. | 340/572.1 |
| 7,849,438 B1 * | 12/2010 | Hemmat et al. | .............. | 717/102 |
| 7,895,563 B2 * | 2/2011 | Carlson et al. | ................ | 717/102 |
| 7,954,051 B2 * | 5/2011 | Achilles et al. | ............... | 715/234 |
| 8,069,435 B1 * | 11/2011 | Lai | ............................... | 717/106 |
| 2003/0009740 A1 * | 1/2003 | Lan | ............................... | 717/102 |
| 2003/0074235 A1 * | 4/2003 | Gregory | ............................ | 705/4 |
| 2003/0172020 A1 * | 9/2003 | Davies et al. | ................... | 705/36 |
| 2005/0021836 A1 * | 1/2005 | Reed et al. | .................... | 709/238 |
| 2005/0055246 A1 * | 3/2005 | Simon | ................................ | 705/2 |
| 2005/0283410 A1 * | 12/2005 | Gosko | ............................ | 705/27 |
| 2007/0250769 A1 * | 10/2007 | Bass et al. | ..................... | 715/523 |
| 2009/0165115 A1 * | 6/2009 | Toumura et al. | ................ | 726/12 |

* cited by examiner

*Primary Examiner* — Don Wong
*Assistant Examiner* — Daxin Wu
(74) *Attorney, Agent, or Firm* — Buchanan Ingersoll & Rooney PC; Robert J. Pugh

(57) ABSTRACT

In various embodiments, a system is provided for building configurable applications. The system may include a distributed tier with a presentation module accessible by a user which is configured to permit configuration of an interface in a session with the user and an interface module configured to process session state data in an extensible language format. The system may also include a mainframe system having an enterprise architecture integration (EAI) framework configured for receiving the extensible language formatted state data and invoking at least one service in association with evaluating the extensible language formatted state data and a business rules engine based on an extensible language format. The mainframe system may be configured to translate the evaluated state data into a reply message based on the extensible language format.

16 Claims, 38 Drawing Sheets

DATE: 03/30/2007           XML PROPERTIES BUILDER           TIME: 14:54:17
CHAPTER NAME: NAPINDEX              SCREEN 1            MAX SIZE: 47,979
SEQUENCE NBR:    1                                       REGION: CIQR

<------------- C O B O L ------------->
FLD  FIELD NAME                    OFF       FIELD     OCCURS         FLD  COB  GRP  RULE
SEQ                                SET       LEN       NUM   DEPTH    TYP  LVL  IND  IND

0001 NAPINDEX                    0000000  0033886  00000  000              01         N
0002 G360-USER-REQUIRED-FIELD    0000000  0000137  00000  000              05   G     N
0003 USER-KEY                    0000000  0000040  00000  000        A     10         N
0004 SUBMITTER-LOGIN             0000040  0000007  00000  000        A     10         N
0005 SUBMITTER-OPERID            0000047  0000003  00000  000        A     10         N
0006 G360ID                      0000050  0000016  00000  000              05   G     N
0007 BPM-FUNCTION                0000066  0000005  00000  000        A     10         N
0008 BPM-SOURCE                  0000071  0000008  00000  000        A     10         N
0009 BPM-SOURCE-TYPE             0000079  0000001  00000  000        A     10         N
0010 BPM-TRAN-GROUP              0000080  0000004  00000  000        A     10         N
0011 BPM-ACTION                  0000084  0000001  00000  000        A     10         N
0012 BPM-TRANSACTION             0000085  0000004  00000  000        A     10         N
0013 TRAN-STATUS                 0000089  0000001  00000  000        A     10         N
0014 TRAN-DESC                   0000090  0000020  00000  000        A     10         N

CLEAR: CANCEL    ENTER: SAVE    F3: SAVE/RETURN    F7/F8: UP/DOWN    F10/F11: LEFT/RIGHT

FIG. 4A

DATE: 03/30/2007　　　　XML PROPERTIES BUILDER　　　　TIME: 14:55:31
CHAPTER NAME: NAPINDEX　　　　SCREEN 2　　　　MAX SIZE: 47,979
SEQUENCE NBR: ___1___　　　　　　　　　　　　　　REGION: CIQR

| FLD SEQ | FIELD NAME | TAG TYP | XML TAG NAME | JST IND | PAD CHR |
|---|---|---|---|---|---|
| 0001 | NAPINDEX | _ | _____ | L_ | _ |
| 0002 | G360 - USER - REQUIRED - FIELD | _ | _____ | L_ | _ |
| 0003 | USER - KEY | _ | userKey_____ | L_ | _ |
| 0004 | SUBMITTER - LOGIN | _ | OperId_____ | L_ | _ |
| 0005 | SUBMITTER - OPERID | _ | amtOperId_____ | L_ | _ |
| 0006 | G360ID | _ | G360ID_____ | L_ | _ |
| 0007 | BPM - FUNCTION | _ | bpmFunction____ | L_ | _ |
| 0008 | BPM - SOURCE | _ | bpmSource_____ | L_ | _ |
| 0009 | BPM - SOURCE - TYPE | _ | bpmSourceType__ | L_ | _ |
| 0010 | BPM - TRAN - GROUP | _ | bpmTranGrp_____ | L_ | _ |
| 0011 | BPM - ACTION | _ | bpmAction_____ | L_ | _ |
| 0012 | BPM - TRANSACTION | _ | bpmTrans_____ | L_ | _ |
| 0013 | TRAN - STATUS | _ | tranStatus_____ | L_ | _ |
| 0014 | TRAN - DESC | _ | transactionDesc | L_ | _ |

CLEAR: CANCEL　　ENTER: SAVE　　F3: SAVE/RETURN　　F7/F8: UP/DOWN　　F10/F11: LEFT/RIGHT

*FIG. 4B*

DATE: 03/30/2007  XML PROPERTIES BUILDER  TIME: 14:56:12
CHAPTER NAME: NAPINDEX  SCREEN 3  MAX SIZE: 47,979
SEQUENCE NBR: 1  REGION: CIQR

410

| FLD SEQ | FIELD NAME | SUP IND | CNV TYP | DFT TYP | DEFAULT VALUE | CNV DIR |
|---|---|---|---|---|---|---|
| 0001 | NAPINDEX | | | | | |
| 0002 | G360 - USER - REQUIRED - FIELD | | | | | |
| 0003 | USER - KEY | | | | | |
| 0004 | SUBMITTER - LOGIN | | | | IDD | |
| 0005 | SUBMITTER - OPERID | | | | | |
| 0006 | G360ID | | | | BPM | |
| 0007 | BPM - FUNCTION | | | | | |
| 0008 | BPM - SOURCE | | | | | |
| 0009 | BPM - SOURCE - TYPE | | | | | |
| 0010 | BPM - TRAN - GROUP | | | | | |
| 0011 | BPM - ACTION | | | | | |
| 0012 | BPM - TRANSACTION | | | | ACCOUNT OWNER | |
| 0013 | TRAN - STATUS | | | | | |
| 0014 | TRAN - DESC | | | | | |

CLEAR : CANCEL    ENTER : SAVE    F3 : SAVE / RETURN    F7 / F8 : UP / DOWN    F10 / F11 : LEFT / RIGHT

DATE: 03/30/2007          XML PROPERTIES BUILDER                    TIME: 14:56:40
CHAPTER NAME: NAPINDEX           SCREEN 4                         MAX SIZE: 47,878
SEQUENCE NBR:    1                                                  REGION: CIQR

FLD     FIELD NAME                          MND   EDIT   VLD   SYST   CONV
SEQ                                         IND   TBL#   TYP   VARB   VARB

0001 NAPINDEX                                —     —     —     —      —
0002 G360 - USER - REQUIRED - FIELD          —     —     —     —      —
0003 USER - KEY                              —     —     —     —      —
0004 SUBMITTER - LOGIN                       —     —     —     —      —
0005 SUBMITTER - OPERID                      —     —     —     —      —
0006 G360ID                                  —     —     —     —      —
0007 BPM - FUNCTION                          —     —     —     —      —
0008 BPM - SOURCE                            —     —     —     —      —
0009 BPM - SOURCE - TYPE                     —     —     —     —      —
0010 BPM - TRAN - GROUP                      —     —     —     —      —
0011 BPM - ACTION                            —     —     —     —      —
0012 BPM - TRANSACTION                       —     —     —     —      —
0013 TRAN - STATUS                           —     —     —     —      —
0014 TRAN - DESC                             —     —     —     —      —

CLEAR: CANCEL   ENTER: SAVE   F3: SAVE/RETURN   F7/F8: UP/DOWN   F10/F11: LEFT/RIGHT

FIG. 4D

03/30/2007  AOR : CIQR;   TBL : 4983 - THIS IS THE NEW ACCOUNT PROPOSAL IN   03 : 01 : 00

[SELECT] [FIND] [MAX DOWN] [MAX UP] [TBL DEF] [COL DEF] [AUDIT TRAIL] [SORT] [HELP]

| KEY | TBL # | ST | KEY T | T/F CLCTN | BEFORE CL | BX | AFTER CL | AX | CCSTB | JSTBL | G |
|---|---|---|---|---|---|---|---|---|---|---|---|
| NAPBENE | 5475 | S | | G360TRFS | NAPBFRUL | N | NAPAFTRU | N | 4525 | 4601 | |
| NAPCDUDL | 5437 | S | | G360TRFS | | | NAPAFTRU | D | 4525 | 5767 | |
| NAPCIPEN | 5217 | S | | G360TRFS | NAPBFRUL | | NAPAFTRU | F | 4525 | 5767 | |
| NAPCIPID | 5215 | S | | G360TRFS | | | NAPAFTRU | C | 4525 | 5767 | |
| NAPCSTEN | 5217 | S | | G360TRFS | NAPBFRUL | C | NAPAFTRU | F | 4525 | 5767 | |
| NAPCSTID | 5215 | — | | G360TRFS | | | NAPAFTRU | C | 4525 | 5767 | |
| NAPFOTO1 | 5015 | S | | G360TRFS | NAPBFRUL | A | NAPAFTRU | A | 4525 | 4601 | |
| NAPHOME | 5401 | U | | G360TRFS | NAPBFRUL | B | NAPAFTRU | B | 4525 | 5767 | |
| NAPISUMM | 5355 | U | | G360TRFS | NAPBFRUL | H | NAPAFTRU | H | 4525 | 4601 | |
| NAPKYCAD | 5465 | U | | G360TRFS | NAPBFRUL | J | NAPAFTRU | J | 4525 | 4601 | |
| NAPKYCEN | 5471 | S | | G360TRFS | NAPBFRUL | L | NAPAFTRU | L | 4525 | 4601 | |
| NAPKYCFE | 5467 | U | | G360TRFS | NAPBFRUL | G | NAPAFTRU | G | 4525 | 5767 | |
| NAPKYCGN | 5447 | U | | G360TRFS | NAPBFRUL | I | NAPAFTRU | I | 4525 | 4601 | |
| NAPKYCIB | 5449 | U | | G360TRFS | NAPBFRUL | K | NAPAFTRU | K | 4525 | 4601 | |
| NAPKYCNP | 5469 | U | | G360TRFS | NAPBFRUL | M | NAPAFTRU | M | 4525 | 4601 | |
| NAPKYCSF | 5473 | U | | G360TRFS | NAPBFRUL | | NAPAFTRU | | 4525 | 4601 | |

F1 : HELP;   F3 : RETURN;   F7/F8 : UP/DOWN;   F10/F11 : LEFT/RIGHT;   F9 : REFRESH;   F12 : EXIT

FIG. 5

03 / 30 / 2007   AOR : CIQR;   TBL : 5215 - NAP CUSTOMER INFORMATION PAGE FOR I   03 : 04 : 32

[SELECT]  [FIND]  [MAX DOWN]  [MAX UP]  [TBL DEF]  [COL DEF]  [AUDIT TRAIL]  [SORT]  [HELP]

↙ 602

| KEY | OBJECT TYP | OBJECT ID | T-TBL | RUL # | PCK | JFK |
|-----|------------|-----------|-------|-------|-----|-----|
| 010 | mainContent |  |  |  |  |  |
| 020 | template | banner | 5489 |  | 010 |  |
| 025 | template | cip section heading | 5585 |  | 010 |  |
| 050 | label | patriot act label |  |  | 010 |  |
| 060 | template | x |  |  | 010 |  |
| 070 | chkBoxHTML2 | capacities | 5469 |  | 010 |  |
| 100 | br |  |  |  | 010 |  |
| 105 | fieldset |  |  |  | 105 |  |
| 130 | legend |  |  |  | 105 |  |
| 135 | input | first name   input & label |  |  | 105 |  |
| 145 | input | middle name  input & label |  |  | 105 |  |
| 155 | input | last name    input & label |  |  | 105 |  |
| 160 | br |  |  |  | 010 |  |
| 295 | radiohtml | customer citizenship |  |  | 010 |  |
| 296 | div | ssndiv |  |  | 010 |  |
| 300 | input | ssn field |  |  | 296 |  |

F1 : HELP;   F3 : RETURN;   F7 / F8 : UP / DOWN;   F10 / F11 : LEFT / RIGHT;   F9 : REFRESH;   F12 : EXIT

```
03/30/2007  AOR: CIQR;  TBL: 5215 - NAP CUSTOMER INFORMATION PAGE FOR I   03:05:22
[SELECT] [FIND] [MAX DOWN] [MAX UP] [TBL DEF] [COL DEF] [AUDIT TRAIL] [SORT] [HELP]
KEY  RGI  ATTRS  PTBL # PKEY  T-TIP  LABEL  CLASS  STYLE  ONCLK  MAP TO TAG
010
020
025
050          4471    071                                                atCIPCustInd
060
070                            1261
100
105                            1544                                     xab
130                            1262
135                            1263
145                            1264                                     WcustFirstName
155                            1265                                     WcustMidName
160          4471    030       1266              s208                   WcustLastName
295                                                                     WcustCitizenCd
296                            1267                      o069           ssndiv
300                                                                     WcustTIN
F1: HELP;  F3: RETURN;  F7/F8: UP/DOWN;  F10/F11: LEFT/RIGHT;  F9: REFRESH;  F12: EXIT
```

632

03 / 30 / 2007  AOR : CIQR;  TBL : 5489 - NAP BANNR           03 : 07 : 23

[SELECT] [FIND] [MAX DOWN] [MAX UP] [TBL DEF] [COL DEF] [AUDIT TRAIL] [SORT] [HELP]

| KEY | OBJECT TYP | OBJECT ID | T-TBL | RULE # | PCK | JFK |
|-----|------------|-----------|-------|--------|-----|-----|
| 001 | TABLE      | OUTER TABLE |     |        | 001 |     |
| 002 | TR         |           |       |        | 002 |     |
| 003 | TD         |           |       |        | 003 |     |
| 004 | CENTER     |           |       |        | 004 |     |
| 010 | TABLE      |           |       |        | 010 |     |
| 015 | TR         |           |       |        | 015 |     |
| 020 | TD         |           |       |        | 020 |     |
| 025 | LABEL      | ACCT TYPE DESC LABEL | | |  015 |     |
| 030 | TD         |           |       |        | 030 |     |
| 035 | LABEL      | ACCT TYPE DESC |  |        | 015 |     |
| 036 | TD         |           |       |        | 036 |     |
| 037 | LABEL      | ACCT TYPE OF CUSTOMER | | | 010 |     |
| 040 | TR         |           |       |        | 040 |     |
| 045 | TD         |           |       |        | 045 |     |
| 050 | LABEL      | ACCOUNT NAME LABEL | |      | 040 |     |
| 055 | TD         |           |       |        |     |     |

F1 : HELP;  F3 : RETURN;  F7 / F8 : UP / DOWN;  F10 / F11 : LEFT / RIGHT;  F9 : REFRESH;  F12 : EXIT

*FIG. 6C*

03/30/2007 AOR: CIQR; TBL: 5189 - CASH RECEIPTS SCREEN 03     03:10:53

| SELECT | FIND | MAX DOWN | MAX UP | TBL DEF | COL DEF | AUDIT TRAIL | SORT | HELP |

| KEY | OBJECT TYP | OBJECT ID | T-TBL | RUL # | PCK | JFK |
|---|---|---|---|---|---|---|
| 075 | LABEL | | | | 020 | |
| 079 | TABLE | | | A42 | 020 | |
| 080 | TR | | | A42 | 079 | |
| 095 | TD | | | | 080 | |
| 100 | INPUT | COR ACCOUNT ENTRY | | | 095 | |
| 105 | TD | | | | 080 | |
| 110 | LABEL | OR LABEL | | | 105 | |
| 115 | TD | | | | 080 | |
| 120 | PICKLIST | BENEPICKLIST | | | 115 | |
| 125 | BR | | | | 010 | |
| 130 | TABLE | | | A46 | 020 | |
| 135 | TR | DDAINFO | | | 130 | |
| 140 | TH | ACCTTYPEHEADER | | | 135 | |
| 145 | TH | ACCTNAMEHEADER | | | 135 | |
| 150 | TH | AVAILBALHEADER | | | 135 | |
| 155 | TH | LEDGERBALHEADER | | | 135 | |

F1: HELP; F3: RETURN; F7/F8: UP/DOWN; F10/F11: LEFT/RIGHT; F9: REFRESH; F12: EXIT

EAI BUSINESS RULES ENGINE BUILDER

SELECT COLLECTION:

| | |
|---|---|
| BREGLBLR | BUSINESS RULES ENGINE GLOBAL TRUE/FALSE RULES |
| DISBSAFT | DISBURSEMENTS AFTER RULES |
| DISBSBFR | DISBURSEMENTS BEFORE RULES |
| DXCGLOB | DUANE GLOBAL TRUE / FALSE RULES |
| DXCRULES | DUANE COLLECTION |
| G360TRFS | GLOBAL 360 TRUE/FALSE COLLECTION |
| NAPAFTRU | NEW ACCOUNT PROPOSAL AFTER RULES |
| NAPBFRUL | NEW ACCOUNT PROPOSAL BEFORE RULES COLLECTION |
| RECTSAFT | AMTRUST RECEIPTS AFTER RULES |
| RECTSBFR | AMTRUST RECEIPTS BEFORE RULES |

NOTE: TO ASSIST

EAI BUSINESS RULES ENGINE BUILDER — 702

G360TRFS  |  GLOBAL 360 TRUE/FALSE COLLECTION

SHOW ONLY RULES STARTING WITH? [ ]  SELECT RULE: [ v ]

[ ADD NEW RULE ]  [ UPDAT... ]

708:

```
PR : 001  A01  ACCOUNT NUMBER VALIDATION RULE
PR : 001  A02  AMTRUST ACCOUNT CONSOLIDATION RULE
PR : 001  A03  AMTRUST ACCOUNT CLOSED RULE
PR : 001  A04  UNAUTHORIZED ACCESS ON AMTRUST ACCOUNT R
PR : 001  A05  AMTRUST SYSTEM UNAVAILABLE ERROR RULE
PR : 001  A06  WIRE RECEIPT DISPLAY BUTTON RULE
PR : 001  A07  SUB-ACCOUNT VALIDATION RULE
PR : 001  A08  WIRE TRUST BANK VALIDATION TO THE TRUST
PR : 001  A09  WMG RECEIPT TAX CODE PICKLIST FOR WIRE N
PR : 001  A10  WHG ACH RECEIPT TAX CODE PICKLIST FOR NO
PR : 001  A11  WHG WIRE/ACH RECEIPT TAX CODE PICKLIST F
PR : 001  A12  I I G RECEIPT TAX CODE PICKLIST
PR : 001  A13  IDENTIFY ACCOUNTING METHOD 3 OR 4
PR : 001  A14  IDENTIFY ACCOUNTING METHOD AS DUAL CASH
PR : 001  A16  TAX CODE PICKLIST FROM CODE SET
PR : 001  A15  DISPLAY RECEIPT TAX CODE BOUNDED PICKLIS
PR : 001  A17  INVALID ASSET RESPONSE CODE FROM TRSITAS
PR : 001  A18  ENTER PAYOR
PR : 001  A19  SELECT PAYOR
PR : 001  A20  IS RECEIPT CURR INDEX < 1
PR : 001  A21  IS RECEIPT CURR INDEX > 0
PR : 001  A22  DISPLAY MULTIPLE RECEIPTS FIELDS FOR CA
PR : 001  A23  IDENTIFY WIRE RULE
PR : 001  A24  IDENTIFY ACH RULE
PR : 001  A25  IDENTIFY CHECK RECEIPT RULE
PR : 001  A26  IDENTIFY DDA - TST TRX RULE
PR : 001  A27  HIDE SAVE AS NEW RECEIPT BUTTON
PR : 001  A28  BROA IS NULL
PR : 001  A29  IDENTIFY BUTTON ON CHECK RECEIPT ENTRY S
```

DONE

EAI BUSINESS RULES ENGINE BUILDER

COLLECTION NAME: G360TRFS  RULE ID: A42  RULE DESCRIPTION: DISPLAY D2T ENTRY FIELDS

TYPE: H-SET TRUE/FALSE ONLY (NO ACTION TAKEN) ∨  PRIORITY: 1  TRIGGER OPER: GT ∨  TRIGGER LVL: 0  SET VAR: ∨

RULE DATA:                                                    RULE DATA TYPE: ∨

| CND# | DEL | FIELD | OPER | TAG/VALUE | TYPE | AND/OR | FIELD | OPER | TAG/VALUE | TYPE | POINTS |
|------|-----|-------|------|-----------|------|--------|-------|------|-----------|------|--------|
| 001 | ☐ | BROA | GT ∨ |  | LIT ∨ | AND ∨ | AUTHRESPONSE ∨ | EQ ∨ | A | LIT ∨ | 1 |
| 002 | ☐ |  | ∨ |  | ∨ | ∨ | ∨ | ∨ |  | ∨ | 0 |
| 003 | ☐ |  | ∨ |  | ∨ | ∨ | ∨ | ∨ |  | ∨ | 0 |
| 004 | ☐ |  | ∨ |  | ∨ | ∨ | ∨ | ∨ |  | ∨ | 0 |

TO OBTAIN A TAG NAME, SELECT FROM THE DROP DOWN PROVIDED. THEN CUT AND PASTE TO THE APPROPRIATE LOCATION.

XML TAG NAME HELP ∨

[UPDATE RULE] [BACK] [DELETE RULE]

*FIG. 7D*

EAI BUSINESS RULES ENGINE BUILDER

COLLECTION NAME: G360TRFS    RULE ID: A42    RULE DESCRIPTION: DISPLAY D2T ENTRY FIELDS

PRIORITY: 1    TRIGGER OPER: GT    TRIGGER LVL: 0    SET VAR:

TYPE: H - SET TRUE / FALSE ONLY (NO ACTION TAKEN)

RULE DATA TYPE:

RULE DATA:
- + - ADD TO AN INCOPY/OUTCOPY FIELD
- − − SUBTRACT FROM AN INCOPY / OUTCOPY FIELD
- A - SET APPLICATION VARIABLE
- B - BUILD OUTPUT OBJECT (XML) - OR ALL OBJS
- C - EAI FRAMEWORK CONVERSION (TAB 2285)
- D - SET INCOPY / OUTCOPY DATA FIELD
- E - ERROR RULE
- F - SET NEW FORM RULE (SMART SCRIPT)
- G - SET GLOBAL VARIABLE
- H - SET TRUE / FALSE ONLY (NO ACTION TAKEN)
- I - INDIVIDUAL ARRAY ELEMENT TRUE / FALSE
- J - REMOVE STORE AND FORWARD
- K - SET NEXT FORM AND LEAVE (NRULE+LRULE)
- L - EXIT RULE PROCESSING
- M - SEND EMAIL
- N - SET NEXT FORM FOR EAI - XSLT FRAMEWORK
- O - SET EAI FRAMEWORK OUTCOPY
- Q - PLACE INPUT MESSAGE ON MQ - QUEUE
- R - RESET APPLICATION FIELD
- S - STORE AND FORWARD USING EAI FRAMEWORK
- T - TRANSLATION
- U - SET USER MESSAGE
- W - DELETE OCCURENCE
- X - SET AND LINK TO EXIT PROGRAM
- 0 - RIGHT JUSTIFY AND ZERO FILL

| CND# | TYPE | AND/OR | FIELD | OPER | TAG/VALUE | TYPE | POINTS |
|---|---|---|---|---|---|---|---|
| 001 | LIT | AND | AUTHRESPONSE | EQ | A | LIT | 1 |
| 002 | | | | | | | 0 |
| 003 | | | | | | | 0 |
| 004 | | | | | | | 0 |

M THE DROP DOWN PROVIDED. THEN CUT AND PASTE TO THE APPROPRIATE LOCATION.

AG NAME HELP

[UPDATE RULE] [BACK] [DELETE RULE]

FIG. 7E

EAI BUSINESS RULES ENGINE BUILDER

COLLECTION NAME: [G360TRFS]  RULE ID: [A42]  RULE DESCRIPTION: [DISPLAY O2T ENTRY FIELDS]

TYPE: [H-SET TRUE/FALSE ONLY (NO ACTION TAKEN) ▽]  PRIORITY: [1]  TRIGGER OPER: [GT ▽]  TRIGGER LVL: [0]  SET VAR: [ ▽]

RULE DATA: [ ]  RULE DATA TYPE: [ ▽] — 720

| CND# | DEL | FIELD | OPER | TAG/VALUE | TYPE | AND/OR | FIELD |
|---|---|---|---|---|---|---|---|
| 001 | ☐ | BROA | GT ▽ | | LIT ▽ | AND ▽ | AUTHRESPONSE ▽ |
| 002 | ☐ | | ▽ | | ▽ | ▽ | ▽ |
| 003 | ☐ | | ▽ | | ▽ | ▽ | ▽ |
| 004 | ☐ | | ▽ | | ▽ | ▽ | ▽ |

```
A - APPLICATION VARIABLE
B - EXIT PROGRAM (PROGRAMS NAME)
C - CNV TYP FROM TAB 2285 + DIR LEFT / RIGHT
D - INCOPY / OUTCOPY DATA FIELD
E - EXIT PROCESS (PROCESS NAME, EDIT TABLE #)
F - FORMULA
G - GLOBAL VARIABLE
I - INTRINSIC FUNCTION
J - EDIT TABLE LOOKUP
L - LITERAL
S - STORE - N - FWD  hhmmss,nnn nnn=max attempts
O - OUTPUT OBJ nnnn(xxx) nnnn=tbl# xxx=key
P - INPUT POSITIONAL VARIABLE
Q - EXIT PROGRAM PROCESSING VIA MQ
R - REMOVE STORE AND FORWARD
S - SYSTEM VARIABLE
T - EDIT TABLE TRANSLATION
V - INPUT DELIMETED VARIABLE
X - INPUT XML VARIABLE
Y - OCCURENCE
Z - OCCURENCE WORKAREA
```

TO OBTAIN A TAG NAME, SELECT FROM THE DROP DOWN PROVIDED. THEN CUT AND PASTE

XML TAG NAME HELP [ ▽]

[UPDATE RULE] [BACK] [DELETE RULE]

*FIG. 7F*

| 03 / 30 / 2007 | | eBUSINESS APPLICATION INTEGRATION<br>LOGGING UTILTIY | | | 03 : 20 : 45 | |
|---|---|---|---|---|---|---|
| USER ID  -:<br>TIME     -: | _____<br>_ : _ : ___ | MESSAGE ID  -:<br>TASK  -: | DSSMESSAGE<br>_____ | DATE  -: | 03 / 30 / 2007<br>(ENTER "=" CURR DT) | |

| I / O | USER ID | MESSAGE ID | DATE | TIME IN | TIME OUT | TASK NUMBER |
|---|---|---|---|---|---|---|
| — | | DSSMESSAGE | 03 / 30 / 2007 | 08 : 20 : 3688 | | 0002679 |
| — | | DSSMESSAGE | 03 / 30 / 2007 | 08 : 20 : 5730 | | 0002681 |
| — | | DSSMESSAGE | 03 / 30 / 2007 | 08 : 21 : 0198 | | 0002684 |
| — | | DSSMESSAGE | 03 / 30 / 2007 | 08 : 21 : 0746 | | 0002687 |
| — | | DSSMESSAGE | 03 / 30 / 2007 | 08 : 21 : 1641 | | 0002691 |
| — | | DSSMESSAGE | 03 / 30 / 2007 | 08 : 21 : 2170 | | 0002693 |
| — | | DSSMESSAGE | 03 / 30 / 2007 | 08 : 22 : 3940 | | 0002723 |
| — | | DSSMESSAGE | 03 / 30 / 2007 | 08 : 23 : 3280 | | 0002744 |
| — | | DSSMESSAGE | 03 / 30 / 2007 | 08 : 27 : 2059 | | 0002796 |
| — | | DSSMESSAGE | 03 / 30 / 2007 | 08 : 27 : 2491 | | 0002798 |
| — | | DSSMESSAGE | 03 / 30 / 2007 | 08 : 33 : 1444 | | 0002894 |
| — | | DSSMESSAGE | 03 / 30 / 2007 | 08 : 33 : 2699 | | 0002896 |
| — | | DSSMESSAGE | 03 / 30 / 2007 | 08 : 33 : 4056 | | 0002918 |
| — | | DSSMESSAGE | 03 / 30 / 2007 | 08 : 33 : 5071 | | 0002920 |

TYPE 'I' INPUT;  'O' OUTPUT;  'C' CONTROL INFO;  F3: PREV SCREEN;  F 7 / 8: UP / DOWN

*FIG. 8*

| 03 / 30 / 2007 | eBUSINESS APPLICATION INTEGRATION<br>INPUT MESSAGE DISPLAY | | 03 : 21 : 05 |
|---|---|---|---|
| USER ID -: | MESSAGE ID -: DSSMESSAGE | TIMEIN -: | 08 : 20 : 3688 |
| DATE -: 03 / 30 / 2007 | TASK -: 0002679 | TIMEOUT -: | |

```
- <dss>
    <ReqId>DSSMESSAGE</ ReqId>
    <userKey></ userKey>
    <OperId>PP11679</ OperId>
    <amtOperId>IEH</ amtOperId>
    <sessionId>NAPINDEX</ sessionId>
    <screenId>NAPSTART</ screenId>
    <screenCtlTblId>4983</ screenCtlTblId>
    <supervisor></ supervisor>
    <returnCode/ >
    <returnText/ >
    <xmlData/ >
</dss>
```

F3 : PREV; F4 : SWAP; F5 : FIND; F7 / 8 : UP / DN; F9 : FORMAT; F10 / 11 : LT / RT; F12 : EXIT

*FIG.9*

```
03 / 30 / 2007            eBUSINESS APPLICATION INTEGRATION            03 : 22 : 13
                              OUTPUT  MESSAGE DISPLAY

USER ID  -:  XXXXXXXX      MESSAGE ID  -:  EAIBREMSG     TIMEIN   -: 08 : 20 : 4134
  DATE     -:  03 / 30 / 2007              TASK  -:  0002679        TIMEOUT  -:

- <object type="label">
              <label>Evaluating . . . </ label>
            </ object>
        </ object>
      - <object type="div">
          - <attrs>
              <attr name="id value=" theScreen" />
            </attrs>
          - <object type="mainContent"  objId="X0001x"   mapTo="" visibility="tru
              <attrs></attrs>
            - <object type=" fieldset"  objId="X0002Account" mapTo="" visibili
              - <attrs>
                  <attr name=" class" value=" groupSection" />
                </attrs>
              - <object type=" legend"  objId=" X0003Account mapTo="" visibi
                - <attrs>

F3 : PREV;   F4 : SWAP;   F5 : FIND;   F7 / 8 : UP / DN;   F9 : FORMAT;   F10 / 11 : LT / RT;   F12 : EXIT
```

BPM APPLICATIONS - MICROSOFT INTERNET EXPLORER PROVIDED BY DESKTOP TECHNOLOGIES

MENU ▸

3:28:21 PM 03/30/2007
LOGOUT

NEW ACCOUNT PROPOSAL

ACCOUNT TYPE: 14-PAMA - INVESTMENT ADVISOR (INDIVIDUAL)
SHORT TITLE:

CUSTOMER INFORMATION PROGRAM

FOR PURPOSES OF PATRIOT ACT COMPLIANCE, YOUR CUSTOMER IS AN INDIVIDUAL

CHECK ALL THAT APPLY:
☐ BENEFICIARY  ☐ GRANTOR  ☐ DONEE
☐ SPRINKLE  ☐ GUARDIAN  ☐ SETTLOR
☐ CUSTODIAN  ☐ TRUSTEE  ☐ PNC INTERESTED PARTY
☐ SETTLOR

CHECK ALL THAT APPLY
☐ BENEFICIARY  ☐ GRANTOR  ☐ DONEE  ☐ SPRINKLE
☐ GUARDIAN  ☐ SETTLOR

CUSTOMER NAME
FIRST [    ]  MI [  ]  LAST [    ]
CUSTOMER CITIZENSHIP: ○ NON-RESIDENT ALIEN  ○ RESIDENT ALIEN  ○ US CITIZEN
DO YOU RESIDE IN US?  ○ NO  ○ YES
COUNTRY OF CITIZENSHIP: [    ]
WAS REQUIRED W-8 OBTAINED?  ○ NO  ○ YES
DID THE CUSTOMER APPEAR IN PERSON TO OPEN THE ACCOUNT?  ○ NO  ○ YES

— 1202

— 1204

03/30/2007  AOR : CIQR;   TBL : 5215 - NAP CUSTOMER INFORMATION PAGE FOR I   03 : 29 : 31

[SELECT] [FIND] [MAX DOWN] [MAX UP] [TBL DEF] [COL DEF] [AUDIT TRAIL] [SORT] [HELP]

| KEY | OBJECT TYP | OBJECT ID | T-TBL | RUL # | PCK | JFK |
|-----|------------|-----------|-------|-------|-----|-----|
| 010 | MAINCONTENT | | | | | |
| 020 | TEMPLATE | BANNER | 5489 | | 010 | |
| 025 | TEMPLATE | CIP SECTION HEADING | 5585 | | 010 | |
| 050 | LABEL | PATRIOT ACT LABEL | | | 010 | |
| 060 | TEMPLATE | X | 5469 | | 010 | |
| 070 | CHKBOXHTML2 | CAPACITIES | | | 010 | |
| 100 | BR | | | | 105 | |
| 105 | FIELDSET | | | | 105 | |
| 130 | LEGEND | | | | 105 | |
| 135 | INPUT | FIRST NAME   INPUT & LABEL | | | 105 | |
| 145 | INPUT | MIDDLE NAME  INPUT & LABEL | | | 010 | |
| 155 | INPUT | LAST NAME    INPUT & LABEL | | | 010 | |
| 160 | BR | | | | 010 | |
| 295 | RADIOHTML | CUSTOMER CITIZENSHIP | | | 010 | |
| 296 | DIV | SSNDIV | | | 010 | |
| 300 | INPUT | SSN FIELD | | | 296 | |

F1 : HELP;  F3 : RETURN;  F7 / F8 : UP / DOWN;  F10 / F11 : LEFT / RIGHT;  F9 : REFRESH;  F12 : EXIT

*FIG. 13*

03 / 30 / 2007  A0R : CIQR;  TBL : 4471 - EAI RADIO CONTROL PARM TABLE        03 : 30 : 03

[SELECT] [FIND] [MAX DOWN] [MAX UP] [TBL DEF] [COL DEF] [AUDIT TRAIL] [SORT] [HELP]

| KEY | DVT# | CDVTK | RI | DI | YI | BI | SC | CB | TP | TDP | DDP | DDL |
|-----|------|-------|----|----|----|----|----|----|----|------|------|-----|
| 066 | 5795 |       | Y  | Y  |    |    |    |    |    |      |      |     |
| 067 | 0025 |       | Y  | V  |    | Y  | Y  |    |    |      |      |     |
| 068 | 1001 |       |    | 3  |    |    |    |    |    |      |      |     |
| 070 | 5805 |       | Y  | 4  |    | Y  |    | Y  | Y  | 033  | 001  | 030 |
| 071 | 0029 |       |    |    |    |    |    | Y  | Y  | 043  | 001  | 040 |
| 163 | 0163 |       |    |    |    |    | Y  |    |    |      |      |     |

F1 : HELP;  F3 : RETURN;  F7 / F8 : UP / DOWN;  F10 / F11 : LEFT / RIGHT;  F9 : REFRESH;  F12 : EXIT

*FIG. 14*

EAI BUSINESS RULES ENGINE BUILDER

COLLECTION NAME: [BREGLBLR] RULE ID: [AAB] RULE DESCRIPTION: [IS SCHEMA NAME > SPACES]

TYPE: [H-SET TRUE/FALSE ONLY (NO ACTION TAKEN) ⌄] PRIORITY: [1] TRIGGER OPER: [GT ⌄] TRIGGER LVL.: [0] SET VAR: [ ⌄]

RULE DATA: [ ] RULE DATA TYPE: [ ⌄]

| CND# | DEL | FIELD | OPER | TAG/VALUE | TYPE | AND/OR | FIELD | OPER | TAG/VALUE | TYPE | POINTS |
|------|-----|-------|------|-----------|------|--------|-------|------|-----------|------|--------|
| 001  | ☐   | SCHEMANAME ⌄ | GT ⌄ | | LIT ⌄ | ⌄ | ⌄ | ⌄ | | ⌄ | 1 |
| 002  | ☐   | ⌄ | ⌄ | | ⌄ | ⌄ | ⌄ | ⌄ | | ⌄ | 0 |
| 003  | ☐   | ⌄ | ⌄ | | ⌄ | ⌄ | ⌄ | ⌄ | | ⌄ | 0 |
| 004  | ☐   | ⌄ | ⌄ | | ⌄ | ⌄ | ⌄ | ⌄ | | ⌄ | 0 |

TO OBTAIN A TAG NAME, SELECT FROM THE DROP DOWN PROVIDED. THEN CUT AND PASTE TO THE APPROPRIATE LOCATION.

XML TAG NAME HELP [ ⌄]

[UPDATE RULE] [BACK] [DELETE RULE]

*FIG. 15*

07/23/2007  AOR: CIQR;  TBL: 5227 - EAI (B)USINESS (R)ULES (E)NGINE UPD       09:26:24

| SELECT | FIND | MAX DOWN | MAX UP | TBL DEF | COL DEF | AUDIT TRAIL | SORT | HELP |

| KEY | OBJECT TYP | OBJECT ID | T-TBL | RUL # | PCK | JFK |
|-----|------------|-----------|-------|-------|-----|-----|
| 265 | MPICKLIST | FIELD2 | | | 260 | |
| 270 | TD | TDFOROPER2 | | | 200 | |
| 275 | MPICKLIST | OPER2 | | | 270 | |
| 280 | TD | TDFORVALUE2 | | | 200 | |
| 285 | INPUT | VALUE2 | | | 280 | |
| 290 | TD | TDFORVALUETYPE2 | | | 200 | |
| 295 | MPICKLIST | VALUETYPE2 | | | 290 | |
| 300 | TD | TDFORPOINTS | | | 200 | |
| 305 | INPUT | POINTS | | | 300 | |
| 310 | BR | BR | | AAB | 000 | |
| 315 | LABEL | TAGHELPMESSAGE | | AAB | 000 | |
| 320 | BR | BR | | AAB | 000 | |
| 325 | FIELDSET | TAGHELPFIELDSET | | AAB | 325 | |
| 327 | LEGEND | TAGHELPLEGEND | | | 325 | |
| 330 | PICKLIST | TAGPICKLIST | | | 325 | |
| 335 | INPUT | CUTANDPASTE | | | | |

F1: HELP;  F3: RETURN;  F7/F8: UP/DOWN;  F10/F11: LEFT/RIGHT;  F9: REFRESH;  F12: EXIT

*FIG. 16*

EAI BUSINESS RULES ENGINE BUILDER — 1702

1706 RULE ID: [AAB] RULE DESCRIPTION: [IS SCHEMA NAME > SPACES] — 1704

COLLECTION NAME: [BREGLBLR]

TYPE: [H-SET TRUE/FALSE ONLY (NO ACTION TAKEN) ˅] PRIORITY: [1] TRIGGER OPER: [GT ˅] TRIGGER LVL.: [1] SET VAR: [ ˅]

RULE DATA: [ ] RULE DATA TYPE: [ ˅]

| CND# | DEL | FIELD | OPER | TAG/VALUE | TYPE | AND/OR | FIELD | OPER | TAG/VALUE | TYPE | POINTS |
|------|-----|-------|------|-----------|------|--------|-------|------|-----------|------|--------|
| 001  | ☐   | SCHEMANAME ˅ | GT ˅ | | LIT ˅ | ˅ | ˅ | ˅ | | ˅ | 1 |
| 002  | ☐   | ˅ | ˅ | | ˅ | ˅ | ˅ | ˅ | | ˅ | 0 |
| 003  | ☐   | ˅ | ˅ | | ˅ | ˅ | ˅ | ˅ | | ˅ | 0 |
| 004  | ☐   | ˅ | ˅ | | ˅ | ˅ | ˅ | ˅ | | ˅ | 0 |

1708

TO OBTAIN A TAG NAME, SELECT FROM THE DROP DOWN PROVIDED. THEN CUT AND PASTE TO THE APPROPRIATE LOCATION.

XML TAG NAME HELP [ ˅]

[UPDATE RULE] [BACK] [DELETE RULE]

*FIG. 17*

FIG. 18 https://webqa.eai.pncbank.com
/eai/EaiLogonServlet?
ReqId=INITSRVREQ
&reasonProduct=CSV
&reasonGroup=CU
&reasonDetail=14
&OperId=PP08920
&cifKey=SUPPO0C3J000

*FIG.21*

```
11/26/2002              eBUSINESS APPLICATION INTEGRATION              08:40:17
                              OUTPUT MESSAGE DISPLAY

USER ID  : ~~03157      MESSAGE ID :  INITSRVREQ    TIMEIN   : __:__:____  15:08:4726
DATE     : 10/02/2002   TASK       :  0003157       TIMEOUT  : __:__:____  15:08:4910

<custAddr1>1121 Chartiers St</custAddr1>
  <custAddr2>Bridgeville, PA 15017</custAddr2>
  <reasonGroupDesc>Client Maintenance</reasonGroupDesc>
  <reasonDetailDesc>Address change only</reasonDetailDesc>
  <contactDate>0000000000</contactDate>
  <operName>RUSSELL, MARK<operName>
  <operMailCode>P6-PUSX-36-1</operMailCode>
  <operFaxNumber>(888) 405-7040</operFaxNumber>
  <operMailCode2>P6-PUSX-36-1</operMailCode2>
  <cifAddr1>1121 CHARTIERS ST</cifAddr1>
  <custCity>BRIDGEVILLE</custCity>
  <custState>PA</custState>
  <custZip>15017</custZip>
  <custZipSuffix>0000</custZipsuffix>
  <oldPhone>(412) 257-4152</oldPhone>
  <oldBphone>(412) 762-2655</oldBphone>

F3: PREV SCREEN;  F4: SWAP;  F5: FORMAT;  F7/8: UP/DWN;  F10/11: LFT/RT;  F12: EXIT
```

*FIG. 23*

```
- <!--
  OLD / NEW ADDRESS
-->
= <TABLE CLASS="outer-tbl" CELLSPACING="0">
= <TR>
= <TD WIDTH="300" CLASS="inner-tbl">
= <TABLE CLASS="no-border" CELLSPACING="3">
=<TR>
<TD>Addr:</TD>
= <TD COLSPAN="5">
= <TABLE CLASS="field-tbl" CELLSPAC1NG="0">
= <TR>
=<TD STYLE="width: 225;">
<xsl:value-of
select="CCTCNTRL/replyCustAcctInfo/cifAddr1" />
</TD>
```

FIG.24

```
<!-- OLD / NEW ADDRESS -->
<TABLE CLASS="outer-tbl" CELLSPACING="0">
<TR>
<TD WIDTH="300" CLASS="inner-tbl">
<TABLE CLASS="no-border" CELLSPACING="3">
 <TR>
<TD>Addr:</TD>
<TD COLSPAN="5">
<TABLE CLASS="field-tbl" CELLSPACING="0">
<TR>
<TD STYLE="width: 225;">
     1121 CHARTIERS ST
</TD>
```

FIG.25

```
var etb1001Key = new
Array("","AK","AL","AR","AZ","CA","CO","CT","DC",
"DE","FC","FL","GA","HI","IA","ID","IL","IN","KS","KY","LA","MA",
"MD","ME","MI","MN","MO","MS","MT","NC","ND","NE","NH","NJ"
,"NM","NV","NY","OH","OK","OR","PA","PR","RI","SC","SD","TN",
"TX","UT","VA","VI","VT","WA","WI","WV","WY");

var etb1001Dsc = new
Array("","ALASKA","ALABAMA","ARKANSAS","ARIZONA",
"CALIFORNIA","COLORADO","CONNECTICUT","DISTRICT OF
COLUMBIA",
"DELAWARE","FOREIGN
COUNTRY","FLORIDA","GEORGIA","HAWAII","IOWA",
"IDAHO","ILLINOIS","INDIANA","KANSAS","KENTUCKY","LOUI
SIANA",
"MASSACHUSETTS","MARYLAND","MAINE","MICHIGAN","MIN
NESOTA","MISSOURI",
"MISSISSIPPI","MONTANA","NORTH CAROLINA","NORTH
DAKOTA","NEBRASKA",
"NEW HAMPSHIRE","NEW JERSEY","NEW
MEXICO","NEVADA","NEW YORK","OHIO",
"OKLAHOMA","OREGON","PENNSYLVANIA","PUERTO
RICO","RHODE ISLAND",
"SOUTH CAROLINA","SOUTH
DAKOTA","TENNESSEE","TEXAS","UTAH","VIRGINIA",
"VIRGIN
ISLANDS","VERMONT","WASHINGTON","WISCONSIN","WEST
VIRGINIA",
"WYOMING");

var etb1001Len = etb1001Key.length;
```

CONFIGURING AND CONSTRUCTING APPLICATIONS IN A MAINFRAME-BASED COMPUTING ENVIRONMENT

CROSS REFERENCE TO RELATED APPLICATION/PRIORITY CLAIM

The present application claims the benefit of U.S. Provisional Patent Application Ser. No. 60/979,499, filed on Oct. 12, 2007, the entirety of which is hereby incorporated by reference.

FIELD OF THE INVENTION

The invention generally relates to systems, processes, tools and strategies for building, configuring and processing applications in a computer-based environment. In various embodiments, the invention more particularly relates to construction and implementation of computer-based applications in connection with a mainframe-based computing platform or environment.

BACKGROUND

To keep pace with competitors, business entities such as financial institutions often need to convert their business processes or workflows into more efficient and productive information technology solutions. Implementing even a seemingly basic change to information technology infrastructure, however, may require involvement by multiple functional layers of the business including accounting, finance, customer service, information technology functions, or possibly other areas.

For example, traditional approaches to building or modifying web-based applications that assist with the client interface or client access aspects of business operations usually involve engaging many technicians with a variety of skill sets and backgrounds. Such conventional approaches may employ end user applications, web servers, ad hoc programming, or other components that compound their functions with existing information architecture to make the information technology system of the business even more complex and difficult to maintain.

Even when considering only the information technology function, multiple personnel must be identified and made available for a given application development task: a skilled HTML programmer may be needed to develop a user interface or browser; a graphics designer may be needed to o develop screen presentation; a Java or .NET programmer may be needed to program application server functions; and/or an integration specialist who understands HTTP or other like protocols may be needed to facilitate communications among different computer systems. In addition, with particular regard to mainframe computing environments, mainframe development expertise may be necessary to ensure effective data communications, transactions and other functionality associated with accessing the mainframe system. Furthermore, the effort involved in functionally testing a proposed modification such as a new web-based application is typically significant, often consuming substantial time and resources across many different functional areas of the business.

Industry movement away from mainframe-focused architecture to distributed application server-based architecture has had further significant disadvantages, especially in view of the issues described above. For example, with respect to data originally stored and communicated from a mainframe system, the data must be pushed to and synchronized with the application servers that ultimately present the data to clients or users. In addition, modifications to applications or data on the mainframe system must likewise be updated for any distributed systems that depend on such mainframe applications or data. Also, copying portions of data or applications from the mainframe to a distributed application server environment can negatively impact security, control, and processing speed for data transactions.

In view of the issues described above, more effective and efficient systems, processes, tools and strategies are needed to build and configure applications and generally to enhance data communication and processing within computer-based environments, especially computing environments which are at least partially dependent on a mainframe computer system.

BRIEF DESCRIPTION OF THE FIGURES

The utility of the embodiments of the invention will be readily appreciated and understood from consideration of the following description of the embodiments of the invention when viewed in connection with the accompanying drawings, wherein:

FIGS. 4A through 6D include examples of interfaces configured for browsing portions of a mainframe system;

FIGS. 7A through 7F include examples of screen displays illustrating various aspects of an interface that can be used as business rules engine builder to access a business rules engine of a mainframe system;

FIG. 8 includes an example of a screen display illustrating a logging utility that can be used by an EAI framework to track messages communicated through a mainframe system;

FIG. 9 shows an example of an initiation message that can be processed by a mainframe system;

FIG. 10 shows an example of an output message matched with an XSLT transformation;

FIGS. 11A, 11B and 12 include examples of output screens which may be generated or configured by a user;

FIG. 13 includes a screen display presenting an example of an edit table associated with the output screen of FIG. 12;

FIG. 14 includes a screen display of a table in a mainframe system which controls lists for screens and interfaces;

FIG. 15 displays an example of an update rule screen;

FIG. 16 includes an example of a mainframe-based screen;

FIG. 17 includes an example of an update rule screen;

FIG. 18 illustrates an example of a modified update rule screen;

FIG. 21 includes an example of a URL search string;

FIG. 23 includes an example of an XML reply which may be communicated in accordance with certain embodiments of the invention;

FIG. 24 displays a transformed version of the XML reply of FIG. 23;

FIG. 25 includes an example of HTML generated in association with the transformed reply of FIG. 24;

FIG. 26 shows a sample of an appended JavaScript file; and,

FIG. 27 includes an example of screen interface displayed as a result of DHTML communicated back to a customer or data communication channel.

DESCRIPTION

In various embodiments, the inventions described herein provide systems, processes, tools and devices that offer technical and non-technical personnel the ability to build and modify screens, interfaces, or web-based applications by using configurable parameters rather than traditional computer programming code. Complex rules and rule extensions can be accessed by users, and this reduces reliance on receiving skilled assistance from technical professionals. In addition, embodiments of the inventions leverage the computing power, control, security and other beneficial aspects of including a mainframe-based platform in a computing environment. In general, embodiments of the invention offer more effective and efficient systems, processes, tools and strategies to build and configure applications and enhance data communication and data processing within computer-based environments which may at least partially depend on the operation of a mainframe computer system.

As applied herein the term "EAI" means enterprise application integration which may include a set of computer system components that allow different system platforms and business areas to communicate effectively with each other. For example, in various embodiments of the invention, an "OS/390" EAI framework may be employed as a gateway for data communicated to or from a mainframe or mainframe-based system.

As applied herein, the term "XSLT" means extensible stylesheet language transformation which may be a program and/or protocol that facilitates the conversion of one data format to another (e.g., such as converting XML to HTML).

As applied herein, the term "MQ" generally refers to a network communication technology allowing independent and potentially non-concurrent applications on a distributed system to communicate with each other (one example of "MQ" is "Websphere MQ" offered by IBM Corporation). MQ may be employed on many different platforms including a "z/OS" mainframe platform, for example.

As applied herein, the term "CICS" (Customer Information Control System) may represent a transaction server that operates primarily on mainframe systems under "z/OS" or "z/VSE" operating systems, for example.

Figure 1:
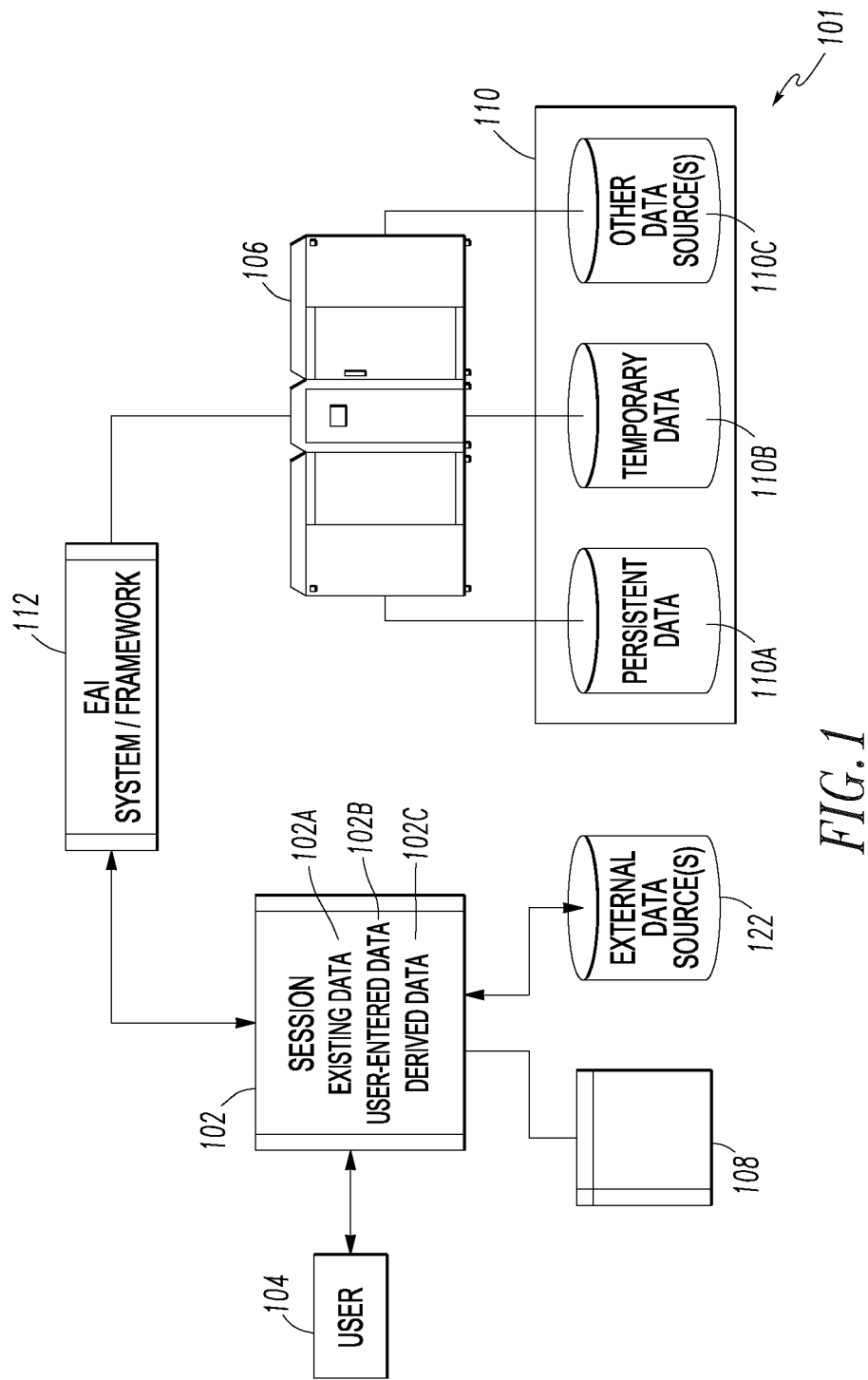
FIG. 1 illustrates an example of a computing architecture or general framework with which various embodiments of the invention may be employed or operatively associated.

FIG. 1 illustrates an example of a computing architecture 101 or general framework with which various embodiments of the invention may be employed or operatively associated. In a given session 102, a user 104 may interact with a mainframe system 106, for example, such as through use of a screen, browser or an interface 108 that allows the user 104 to manipulate, modify or enter data for processing by the mainframe system 106. The session 102 may have a beginning state when the user 104 initially begins data manipulation and an end state when the user 104 completes data manipulation activity. At the end state of the session 102, the mainframe system 106 may store data entered or modified by the user 104, and/or the mainframe system 106 may direct or execute one or more services, business actions, and/or transactions based on the data in the session 102. The data may be stored in the mainframe system 106 in one or more storage media 110, which may represent persistent state data (in a persistency layer) 110A, temporary data 110B, or other data sources 110C. In the context of a financial institution, for example, data stored on the storage media 110 may include customer information stored on an IMS database, account information stored on a VSAM database, and/or customer contact information stored on a DB2 database.

The state data developed or used in association with a given session 102 may include one or more of existing data 102A, user-entered or manipulated data 102B, or derived data 102C. For example, in the context of the business operations of a financial institution, existing data 102A may be data associated with reviewing the checking account of a customer; user-entered or manipulated data 102B may comprise a user-entered configuration or adjustment to be made to the displayed account number; and, derived data 102C may comprise data generated as a result of processing a combination of existing data 102A and/or user-entered data 102B. Upon receiving additional information or embellishment of the session 102 from the user 104, the mainframe system 106 may use the additional data to develop derived data 102C for the checking account as a result of the session 102, such as by modifying a variable which represents how the current account balance will be displayed, for example.

For purposes of the present account information example, processing account data interface configurations or modifications through the mainframe system 106 may include invoking one or more services of an EAI system 112. Services executed by the EAI system 112 may include calling and executing one or more APIs, for example. For example, the EAI system 112 may receive account related data from the user 104, and an account inquiry service may be invoked by the EAI system 112 to retrieve and process data within the mainframe system 106. Subject to the state data associated with the session 102, such as a tag name identified as an account name, the EAT system 112 may return data to the user 104 corresponding to specific aspects of the state data. For example, a service of the EAT system 112 may be invoked to parse retrieved data to select the user ID or user name data for the user 104 from among other stored data. In addition, one or more external data sources 122 may be accessed in addressing user 104 requests. For example, an HTTP or MQ request may be formatted and communicated to external data sources 122 such as an Oracle database or a Lotus Notes database to retrieve and return the requested information to the user 104.

Non-limiting examples of transactions or data processing activities which may be performed by the EAI system 112 include CICS-based protocol conversions (e.g., XML, delimited, NVP, SOAP); transport insulation (e.g., MQ, HTTP); load balancing and message routing; parallel and serial processing; error handling and message logging; message simulation; data conversions and domain validations; custom conversions; synchronized and non-synchronized processing; default settings; COBOL formatting (e.g., justifications, padding, binary and packed fields, etc.); rule-based parsing; tagging; data enrichment; data editing; and/or batch processes including data extraction and aggregation. In certain embodiments, the EAI system 112 may represent a dedicated EAI system, in that each instance runs in its own address space and is configured for a specific function, such as for high volume and/or background transactions. Such a dedicated EAI system may be configured for inquiry-only processing, for example, or other less critical functionality such as IVR marketing and dialer functionality to promote reduced CPU consumption and quicker system response times.

Figure 2:
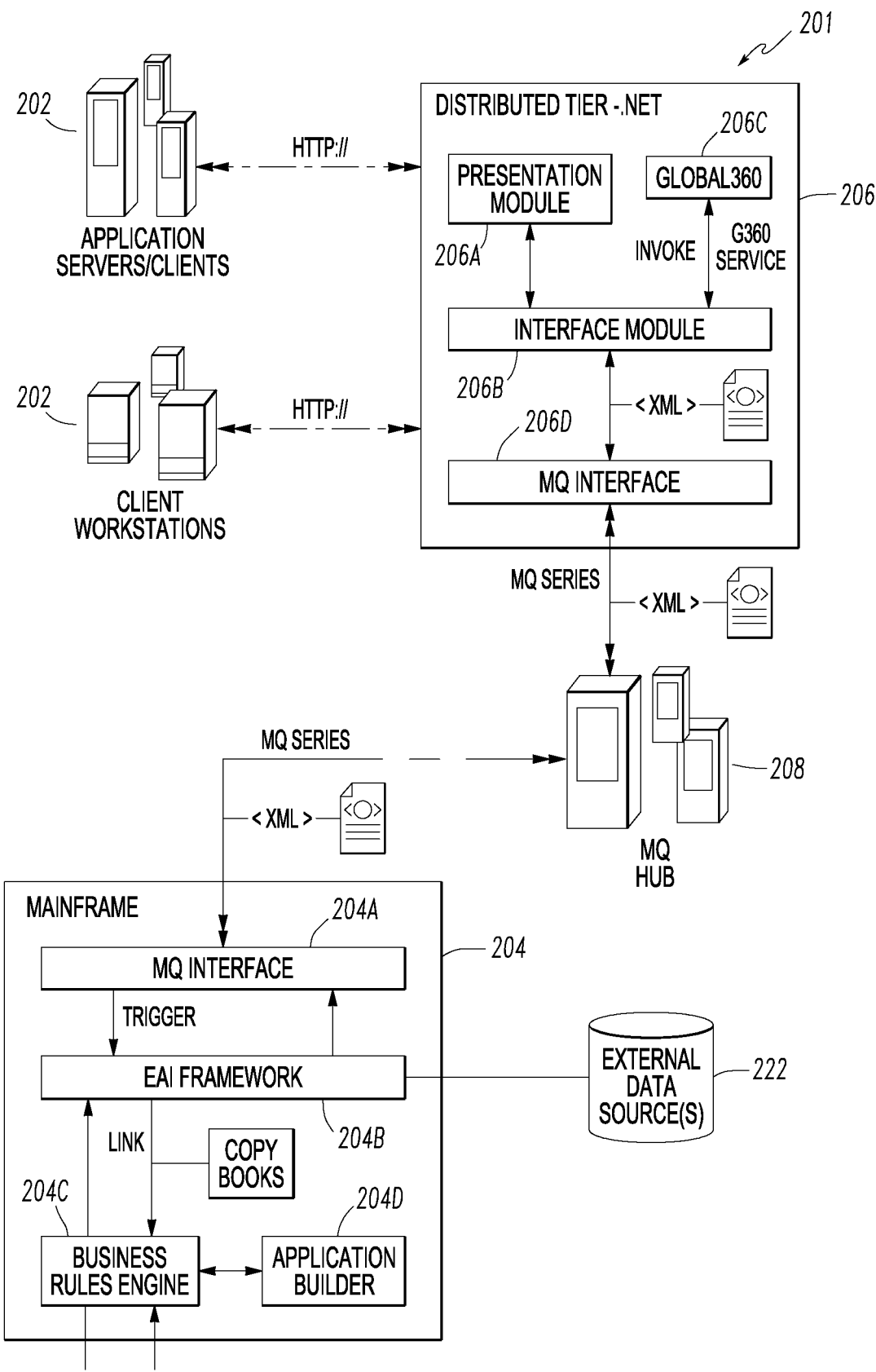
FIG. 2 schematically illustrates an example of a mainframe-based architecture with which various embodiments of the invention may be employed or operatively associated.

With reference to FIG. 2, an example of a mainframe-based architecture 201 is illustrated in which various users 202 may build or develop configurable applications, browse aspects of a mainframe system 204, or perform other tasks or functions through a distributed tier 206. In the example shown, users 202 may use a browser program to type in a URL address for communication to the distributed tier 206 by a protocol such as HTTP, for example. The initiating string of data or state data represented by the URL address may provide an indication of changes or modifications to a screen, interface or other application as may be desired by the user 202. In a financial institution, for example, such applications may include account inquiry applications, funds transfer applications, new account proposal applications, payment applications, or many others. The state data represented by the initiating string data may change from session to session for different users 202. For example, the initiating string data may include the name of an application to be invoked, a user ID, state data (which may specify a starting point for the application to be invoked), and/or other pertinent data.

In the distributed tier 206, the users 202 may access a presentation module 206A which can be configured to generate interfaces and generally manage interaction with the users 202. The distributed tier 206 may include a .NET or WAS server, for example, configured to perform various data processing functions. An interface module 206B may be configured to route or communicate calls to or from the presentation module 206A or a business process management ("BPM") system 206C (e.g., such as a "Global360" or "G360" BPM system). The interface module 206B may also provide MQ abstraction, such as when communicating requests or other data with the mainframe system 204. The business process management system 206C may provide workflow management, imaging, or archiving functions for various aspects of the invention. In operation, a user 202 configuring an application may submit a constructed application (e.g., built by customizing user interfaces or screens, or collecting data for the screens) to the business process management system 206C for approval through another operational area or by management personnel of a financial institution. In various embodiments, a constructed application may be saved in XML format, for example, and then submitted for approval to the business process management system 206C. The XML-formatted application or interface may be derived from state data associated with work performed by the user 202. It can be appreciated that use of state data permits users 202 to return to an application at a prior stage of completion, perhaps to revise or continue work on the application.

Referring again to FIG. 2, data requests or calls may be communicated through an MQ interface 206D of the distributed tier 206 through an MQ hub 208 to the mainframe system 204. In various embodiments, such data requests or calls may be communicated to the mainframe system 204 via a variety of suitable protocols. An MQ interface 204A of the mainframe system 204 receives communications from the MQ hub 208 and passes them to an EAI framework 204B. In various embodiments, the EAI framework 204B may be configured to serve as an MQ connector, an XML generator or translator, and/or a field level data validator for data communicated to and from the mainframe system 204. The EAT framework 204B may be a distributed computing system that operates various functions of an organization or financial institution, such as desktop functions, teller transactions, online banking activities, and many others. In various embodiments, the EAI framework 204B may be configured for communication with one or more external data sources 222, which may include one or more non-mainframe-based data sources. Non-limiting examples of non-mainframe-based data sources 222 include Oracle databases, Lotus Notes databases, and the external data sources 222 may include other types of storage devices or applications maintained or executed on an application server or server cluster.

In operation, the EAI framework 204B may receive XML-formatted state data and call a service in response to the received data. The XML-formatted data may be parsed, validated, or otherwise processed when the called service is executed. The processed data may be compared against a business rules engine 204C of the mainframe system 204. The business rules engine 204C may contain one or more rules that can be triggered based on data processed by the mainframe system 204. An application builder 204D may be operatively associated with the business rules engine 204C. In various embodiments, the application builder 204D may be configured for creating presentation definitions in XML, HTML, or for using custom tags, for example. The business rules engine 204C may be configured to support rule definitions and pre-processing or post-processing of transaction data. Based on the state data contained in the communicated data, the mainframe system 204 may select a blank presentation template for communication back to the user 202 or a preconfigured presentation based on existing state data.

Based on the application invoked and the state data, the mainframe system 204 evaluates the screen, interface or other application, and modifications or revisions thereto, desired by the user 202. In performing this evaluation function, the mainframe system 204 may access one or more before-rules and/or one or more after-rules stored in the business rules engine 204C. For example, if an account number is in the state data of the data communicated to the mainframe system 204, a before-rule may be applied to trigger a number of transactions or data retrieval actions, for example, prior to returning the screen or application to the user 202. Likewise, an after-rule may be configured to determine whether the account number is numeric and then invoke an EAI framework 204B service that retrieves certain data in accordance with the numeric account data. An another example of an after-rule is a rule that navigates from screen to screen based on retrieved data, such as once numeric account data is retrieved or once user authorization is confirmed. In still another example, a subsequent screen can have an associated before-rule that retrieves or authorizes account data or other account information once the screen is activated. In various embodiments, the before-rules and after-rules may be generally considered application logic employed by the mainframe system 204 and may be stored as XML-based data.

In various embodiments, the business rules engine 204C may include one or more configurable screen definitions, each of which define one or more aspects of a given screen, interface or application. For example, screen definitions may determine whether labels, tables, pick lists, drop-down menus, check boxes, radio buttons, or many other elements are displayed or can be accessed on a screen or interface. In addition, the screen definitions may determine whether one or more complex objects are applied to a screen. Such complex objects may employ one or more other individual objects. An example of such a complex object is a pick list, including a label for the pick list, values for the pick list, and actions associated with selecting items in the pick list. Embodiments of the invention may facilitate multiple embellishments such as determining an action when a check box is checked, such as opening access to a new portion of the screen, for example.

It can be appreciated that such screen configuration is facilitated without requiring formal programming or coding of scripts by the user 202.

In providing return communications of screens, interfaces, applications or other data to the user 202, an XSLT transformation or translation may be performed in certain embodiments to provide HTML or another suitable protocol which can be viewed on a browser employed by the user 202. Such transformation or translation may be performed by one or more portions of the distributed tier 206, for example, or other components of the system architecture 201.

Figure 3:
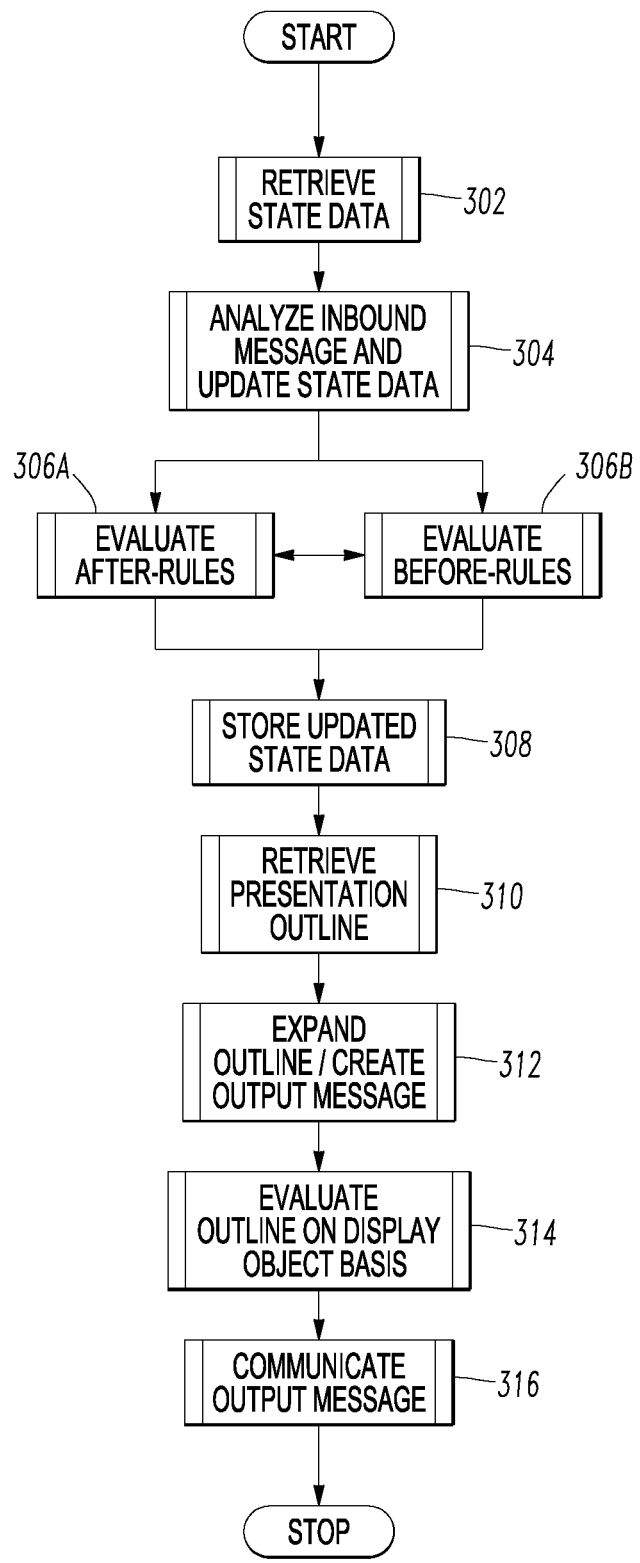
FIG. 3 includes a process flow diagram illustrating a method for communicating and processing data in accordance with embodiments of the invention.

FIG. 3 includes a process flow diagram illustrating an example of processing data between the user 202 and the mainframe system 204. At step 302, state data may be retrieved from the persistency layer or permanent storage of the mainframe system 204. At step 304, input data communicated from the user 202 in the form of an inbound XML message, for example, may be parsed by a called parsing service of the EAI framework 204B to analyze the contents of the communicated XML message and update the state data. The business rules engine 204C may then be invoked at step 306A to evaluate any applicable after-rules associated with the current interface or application of the user 202; likewise the business rules engine 204C may invoked at step 306B to evaluate any applicable before-rules to be applied to the user 202 interface. Application of the before-rules and after-rules at these steps may also trigger events such as changing a field in the state data, invoking a service of the EAI framework 204B to read a database and then update the state data, send an e-mail, or many other actions. At step 308, updated state data associated with the user 202 session may be stored to the persistency layer of the mainframe system 204.

At step 310, the mainframe system 204 may retrieve a user-configured presentation layer outline to be applied as the next user interface. Based on the current state data, the presentation layer outline may be expanded to accommodate the internal structure of the state data at step 312. The mainframe system 204 may then evaluate the presentation layer outline on a display object basis and create an output XML message at step 314. At step 314, each display object may be interrogated to determine one or more of the following: should it be displayed, e.g., based on a business rule?; what is the object type, e.g., static or variable?; what are the object attributes, e.g., static or rule-based?; what are the object properties, e.g., static or rule-based?; how is the object populated, e.g., static from state data, static pick list, dynamic pick list invoking EAI services, defaulted, or other?; what are the object events, e.g., static or rule based?; and/or other considerations. At step 316, the output XML message may be communicated back through the EAI framework 204B ultimately to be transformed and viewed on a browser of the user 202.

Referring now to FIGS. 4A through 4D, examples of interfaces configured for browsing portions of the mainframe system 204 are shown. In these examples, data associated with an application called New Account Proposal (i.e., "NAP") are displayed. With reference to FIG. 4A, the screen 402 displays a COBOL definition of fields 404, including a layout description wherein the whole layout is 33,886 bytes in length; a G360-user-required-field is 137 bytes in length with an offset or displacement of zero; a user-key field is 40 bytes in length, which is a sub-field of the G360-user-required-field and also starting at zero. In this example, the G360-user-required-field comprises a collection of multiple fields.

With reference to FIG. 4B, various components of the EAI framework are displayed in a screen 406, including various XML tag names 408. The screen 406 demonstrates how communicated XML documents can be identified and processed by the mainframe system 204, such as by mapping the XML documents into a layout for execution by a program or application, For example, for a submitter-login field, a value would be provided for a corresponding OperID tag name. FIGS. 4C and 4D show additional aspects of the XML tag names such as default values (see screen 410 of FIG. 4C) and edit table identification (see screen 412 of FIG. 4D) which can be configured for use by the EAI framework 204B of the mainframe system 204.

Referring now to FIG. 5, a screen display 502 illustrates an example of an edit table 504 for the NAP index (described above). The edit table 504 displays screens or interfaces that are registered with the NAP index. Based on the state data of the user 202 communicated to the mainframe system 204, the edit table 504 can be applied to identify a starting point for a given interface or application. In the context of the example of new account proposals, the edit table 504 includes various different starting points and different screens that are registered with a particular application. As shown, the edit table 504 may include designations for true/false rules collections 506, designations for before-rule collections 508, and designations for after-rule collections 510. In general, the edit table 504 may at least partially direct the activity of the mainframe system 204 in determining where to go to find information and what tasks or transactions to perform for a given application.

With reference to FIGS. 6A through 6C, accessing the "NAPCIPID" key on the edit table 504 of FIG. 5 generates screen displays 602, 604 for a NAP customer information page. As shown, the screen display 602 may include object types, object IDs, template table ("T-TBL"), and rule numbers ("RUL#") among other field sets or field values. The objects may elements such as banners or checkboxes, for example, or may be complex objects which comprise a collection or arrangement of individual objects. For example, a "template" may represent a collection of screen components for display on an interface or application. As shown in the screen display 604, fields such as repeating group ("RGI") 606, attributes 608, tool tips 610, labels 612, classes 614, styles 616, on-clicks 618, and map-to tags 620 may be included. For example, the on-clicks 618 may indicate that a task or function is to be performed once a selection is made in a configured screen or interface. The map-to tags 620 may be configured to map to a tag name in the state data; for example, "atCIPCustInd" may be mapped to a corresponding name in the state data. It can be appreciated that state data obtained from various user 202 sessions can be leveraged in connection with embodiments of the invention to direct transactions, call applications, or execute data retrieval functions occurring within the EAI framework 204B or from external data sources 222 by applying definitions naturally embedded within an extensible language such as XML.

FIGS. 6C and 6D show screen displays 632, 634 which result from reviewing the "banner" object presented on the screen display 602. These displays 632, 634 demonstrate that the complex object represented by the "banner" template includes a number of individual objects, such as different labels. In addition, the "banner" template may be a reusable or transferable component for different applications or interfaces constructed by accessing the mainframe system 204.

Figure 7B:
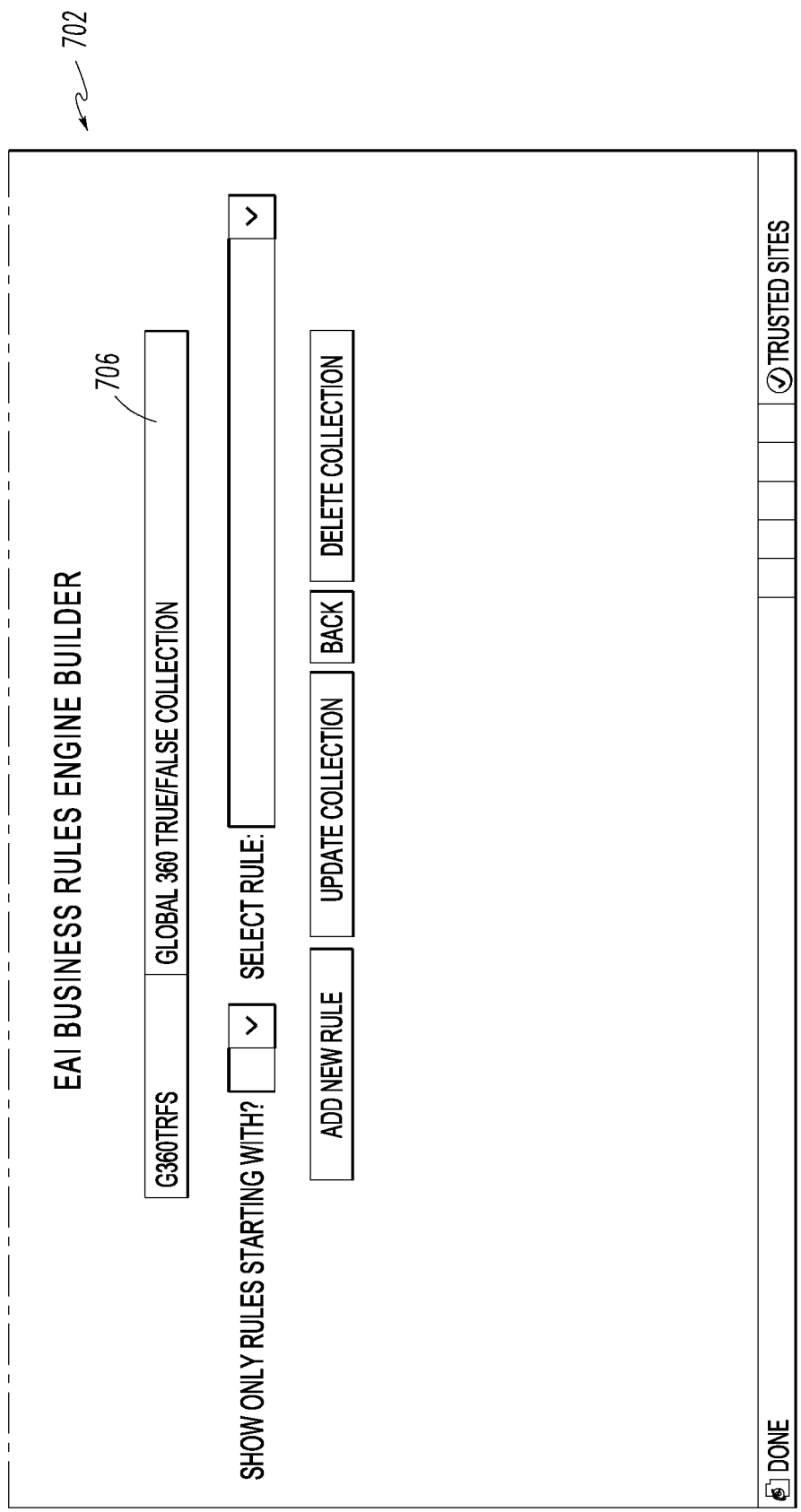

With reference to FIG. 7A, a screen display 702 illustrates an interface that can be used as business rules engine builder to access the business rules engine 204C of the mainframe system 204. The interface permits the user 202 to select from among different rules collections 704 such as by accessing a drop-down menu, as shown. FIG. 7B shows that the "Global 360 True/False Collection" 706 has been selected; and FIG.

7C shows a sampling of the individual rules 708 contained within the "Global 360 True/False Collection" 706. FIG. 7D illustrates that if rule ID "A42" 710 is selected from the list of individual rules 708, various characteristics of the rule can be displayed or modified, such as rule description 712, rule type 714, rule trigger operator 716 (e.g., "greater than" or "less than" or "equal to"), and/or trigger level 718. For example, in the rule shown, if an entry is made in a field called "BROA" (which may represent "bank regional office account"), and the "authResponse" is equal to an "A", then one point is given. Since one point is greater than the trigger level of zero, the rule is activated then the action of "Display D2 entry fields" is executed. In contrast, if the rule has a false condition, then this action is not executed. FIG. 7E illustrates examples of different rule types 714; and FIG. 7F illustrates different examples of rule data types 720. It can be appreciated that rules in the business rules engine 204C may perform a variety of tasks or functions when triggered. For instance, rules may be configured to send e-mails, to set the next screen that should be presented in an application, to add a field to a screen in the application, and/or many others. The rule data types 720 may be used to set a field in the state data based on a lookup into the edit table. For example, if the field value is "PA", then another field in the state data can be connected to the lookup value, which in this case would be "Pennsylvania" for the "PA" field value.

With reference to FIG. 8, a screen display 802 illustrating a logging utility that can be used by the EAI framework 204B to track messages (e.g., DSS messages) communicated through the mainframe system 204. Such messages may be communicated in association with the activity of users 202 in modifying screens, interfaces, or other applications. FIG. 9 shows an example of a specific initiation message and generally illustrates the kinds of messages that can be processed by the mainframe system 204. In various embodiments, the systems described herein may perform message authentication including token processing (e.g., critical messages can be secured, validated through a token or one-time use token, tokens may expire after a configurable time period, stand-alone token processing—a token routine can be used to authenticate distributed system access between thick and thin client applications); message security and alerts (e.g., alerts configurable by application ID which can be communicated to a pager, consol log, or report); rule-based message publication (e.g., messages can be queued or posted based on content, and a single message can have multiple publication rules, allowing for multiple subscription vehicles or publication clearinghouses); rule-based store and forward which allows EAI applications to store messages for processing at a later time based on message content (e.g., number of attempts and wait interval can be configured).

FIG. 10 shows an example of an output message 1002 matched with an XSLT transformation, wherein an object type equals "div" will be transformed by the XSLT to create a "div" tag in HTML. The output message 1002 may also be reviewed to determine that attributes called "id" and "theScreen" are present in the message 1002. Through the XSLT transformation, source code may be generated, such as in HTML format which can be processed by a browser of the user 202.

Figure 11A:
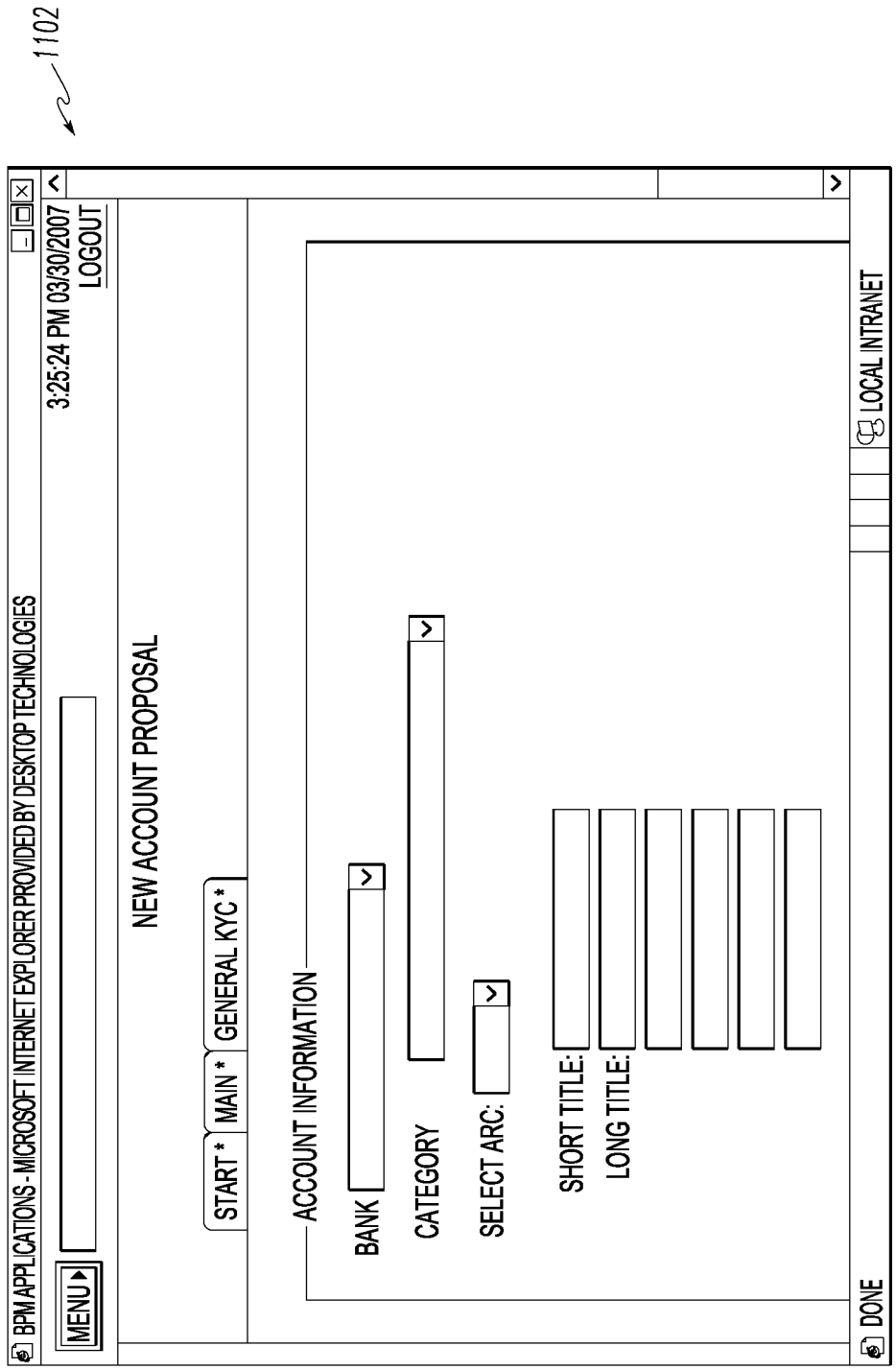
Figure 11B:
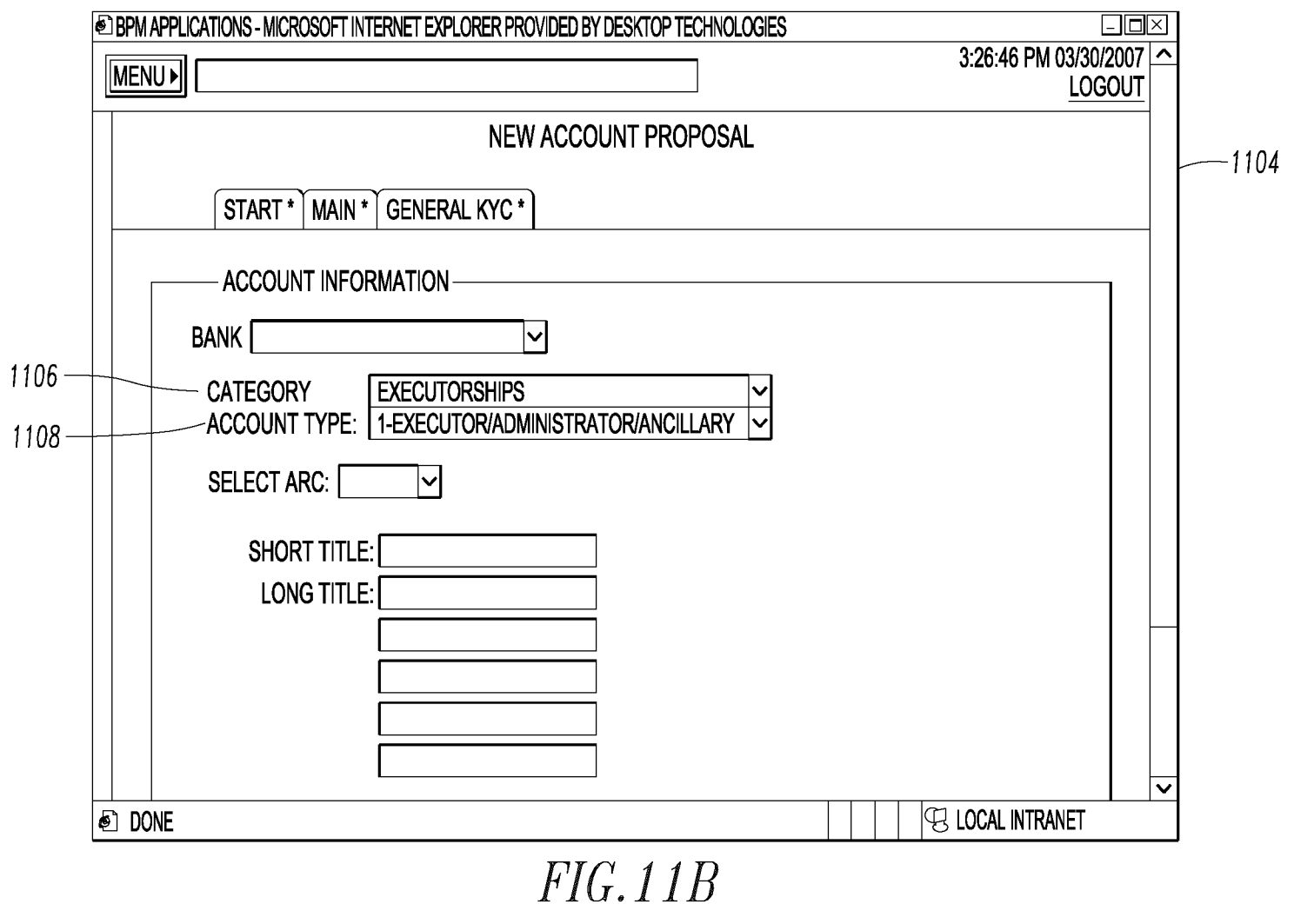

An example of an output screen 1102 generated or configured by a user 202 is shown in FIGS. 11A and 11B. The screen display 1104 demonstrates that once "Executorships" is selected in the "Category" field 1106, then an on-click rule is triggered to display only one account type for the "Account Type" field 1108, which is the "1-Executor/Administrator/Ancillary" account type.

Another example of an output screen 1202 is shown in FIG. 12. A section 1204 of the screen 1202 requests that states "check all that apply" with respect to various status identifiers for an individual client of a financial institution (i.e., beneficiary, grantor, donee, sprinkle, guardian and settlor). FIG. 13 includes a screen display 1302 presenting an edit table 1304 associated with the output screen 1202 of FIG. 12. As shown at line 70 of the edit table 1304, there are entries for "chkBoxHTML2" as an object type 1306 and "capacities" as its corresponding object ID 1308. As shown in FIG. 14, a screen display 1402 displays a "Radio Control Parm" table 1404 which controls lists for screens and interfaces. As shown, entry 71 of the table 1404 points to a domain value table of 29; has a positive or "Y" required indicator ("RI"); and has a direction indicator ("DI") value of 4 (which directs the display of 4 boxes across the screen until the next line is reached—as shown in the section 1204 of the output screen 1202, there are 4 boxes displayed on a first line followed by 2 boxes displayed on a second line). The table 1404 is also a dynamic table, which means that the table 1404 is based on one or more dynamic features, such as actual values on the output screen 1202 may change based on user-entered data, for example. In general, it can be appreciated that many changes in screen configurations can be readily and conveniently converted into what otherwise might be complex source code and implemented in a computer system by employing the enhancements offered by embodiments of the invention.

Figure 18:
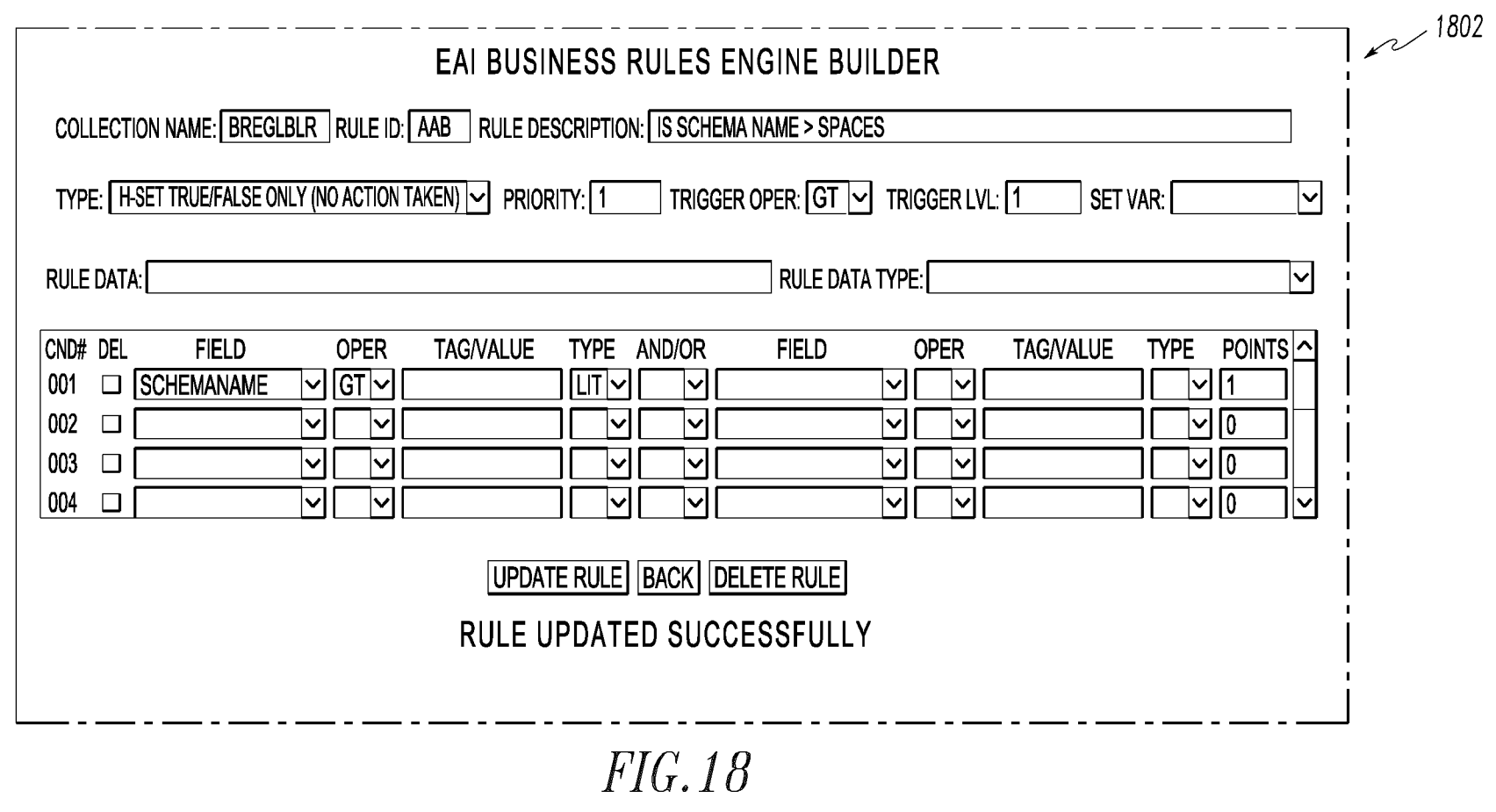

In various embodiments, the business rules engine builder (as described above) may be used to build its own aspects or features. FIG. 15 displays an update rule screen 1502, including definitions for "Rule AAB" 1504, in which the rule 1504 returns a "true" value if the "schemaName" field 1506 is greater than ("GT") blank space. That is, one point ("1") is assigned if "schemaName" 1506 is greater than blank spaces or a blank entry. It can be seen that since one point is greater than zero (which is the trigger level 1508), then the rule would return a "true" value in this scenario. As shown in the mainframe-based screen 1602 of FIG. 16, the "AAB" rule number 1604 ("RUL#") controls whether a tag help message and fieldset section 1508 will appear on the "Update Rule" screen. If the AAB rule returns a "true" value, then objects with keys 310, 315, 320, 325 and all descendants ("PCK") thereof will display on the screen 1502. As shown in the update rule screen 1702 of FIG. 17, the trigger level 1704 for the "AAB" rule 1706 has been changed to a value of "1" which will effectively prevent the rule 1706 from being triggered. That is, in this scenario the condition points value 1708 will never exceed the trigger level value 1704. FIG. 18 illustrates the now modified update rule screen 1802 without the tag help message and fieldset section 1508, because the "AAB" rule 1706 returns a "false" value and the screen builder will not display the objects in the section 1508.

In developing the mainframe-based EAI architecture and framework embodiments described herein, the inventors have discovered the benefits of leveraging existing legacy applications, creating a data synchronization vehicle across disparate platforms and databases, combining disparate data from multiple platforms into the same user interface, facilitating multiple message format brokering, allowing multiple transports (e.g., MQ), and/or allowing multiple message protocols (e.g., XML). Within an EAI framework, legacy integration can be readily accomplished: advanced capabilities can be created including a business rules engine; publish and subscribe functionality and rules-based store and forward processing can be executed; various business areas of a financial institution (e.g., retail and non-retail) can be leveraged; and distributed components can be introduced including web services integration for messages, for example, and an XSLT framework for template-based development.

Figure 19:
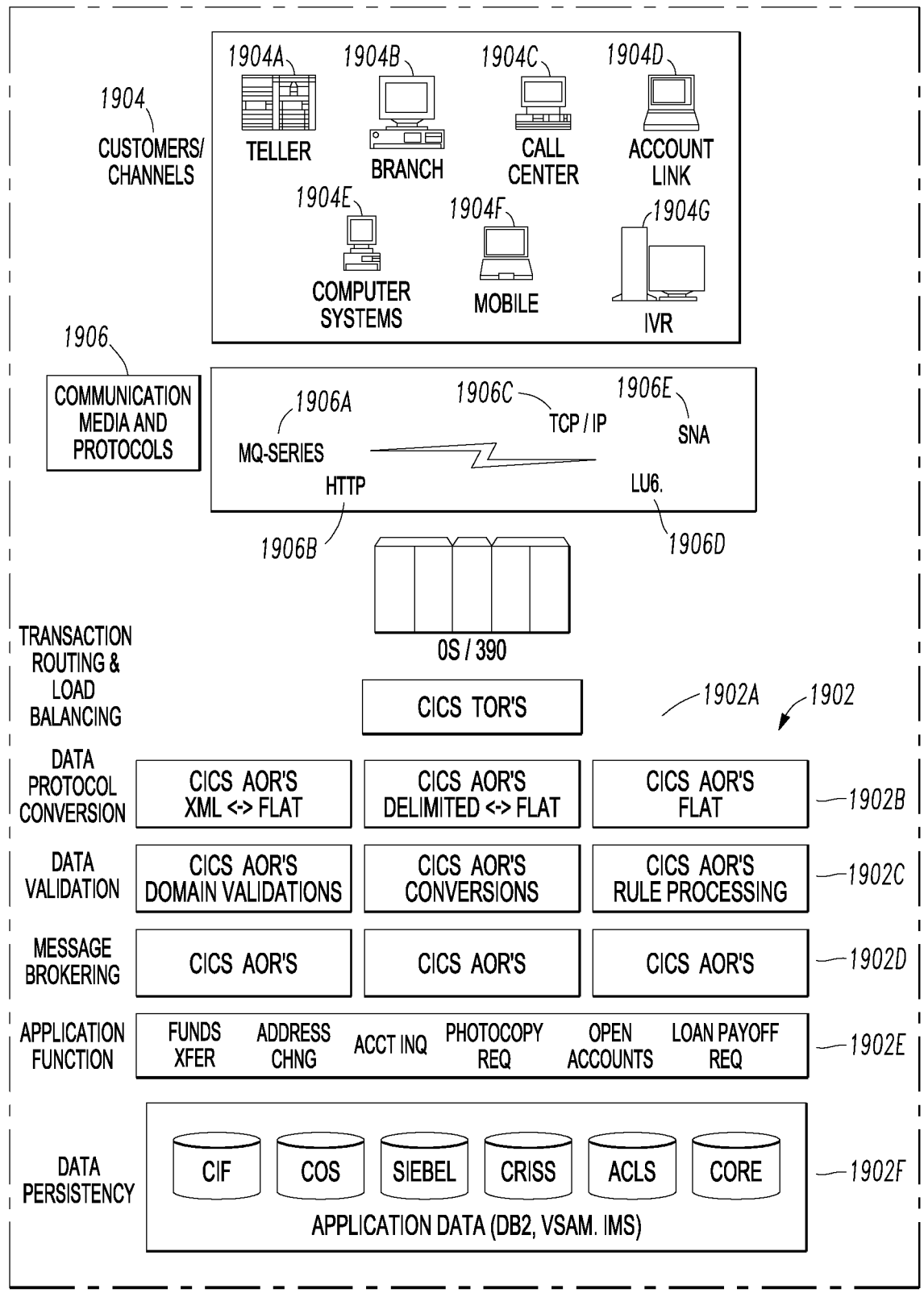
FIG. 19 illustrates an example of an EAI framework structured in accordance with embodiments of the invention.

FIG. 19 illustrates an example of an EAI framework 1902 structured in accordance with embodiments of the invention. Various customers or channels 1904 may interact with the EAI framework 1902 through a variety of communication media and protocols 1906, as shown. In the exemplary context of a financial institution, non-limiting examples of communication channels 1904 include teller systems 1904A, branch systems 1904B, call center systems 1904C, account links 1904D, computer systems 1904E, mobile computer systems or access devices 1904F, and/or interactive voice response (IVR) systems 1904G. Likewise, non-limiting examples of the communication media and protocols 1906 include MQ-Series 1906A, HTTP 1906B, TCP/IP 1906C, LU6 1906D, and SNA 1906E. Within the EAI framework 1902, which may be structured for operation in a mainframe or mainframe-based system, a number of components may be included for various transactions or functions. For example, the EAI framework 1902 may include a transaction routing and load balancing layer 1902A; a data protocol conversion layer 1902B; a data validation layer 1902C; a message brokering layer 1902D; an application function layer 1902E; and/or a data persistency layer 1902F.

Figure 20:
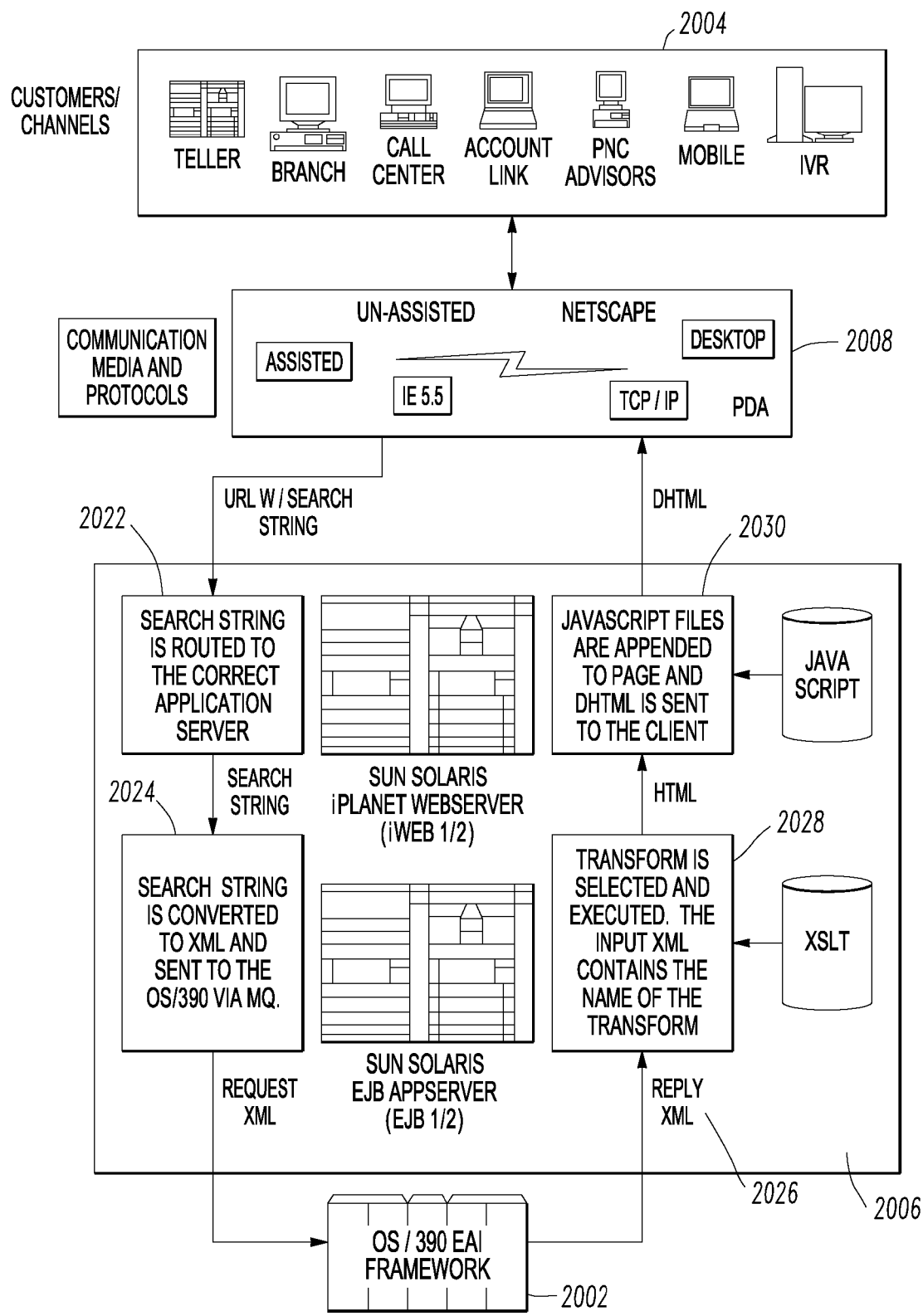
FIG. 20 illustrates an example of an EAI framework structured with a mainframe based, XML rules-based engine and various associated process steps.

Referring now to FIG. 20, the EAI framework 2002 may be structured with a mainframe-based, XML rules-based engine that assists with data communication and processing with customers or channels 2004 through an application server tier 2006. The channels 2004 may communicate with the application server tier 2006 through one or more types of communication media or protocols 2008, as shown. In conventional mainframe environments, COBOL or another type of programming architecture is usually employed which can be considered "flat" or one-dimensional in the sense that such programming does not fundamentally possess a descriptive language that describes where elements (e.g., objects or complex objects) can be accessed. In contrast, embodiments of the invention may employ a business rules engine expressed using an extensible language such as XML, for example, as a basis for the rules triggered and executed by the system.

Figure 22:
FIG. 22 illustrates an example of the URL search string of FIG. 21 as converted into XML.
Figure 27:
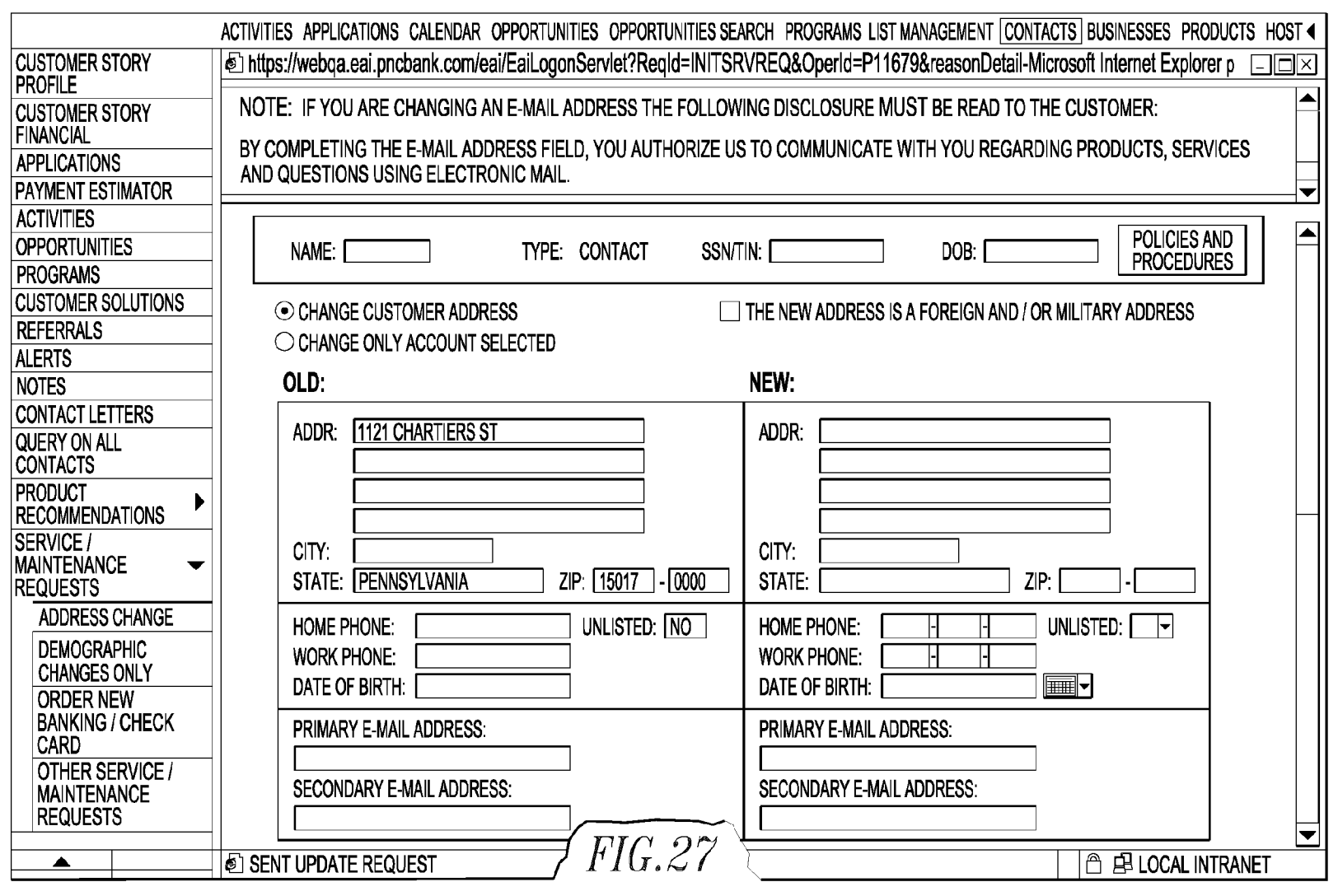

At step 2022, a URL search string may be initiated from a customer or channel 2004 through one of the communication media or protocols 2008 for routing to an application server in the application server tier 2006. An example of such a URL search string is illustrated in FIG. 21. At step 2024, the URL search string may be converted into XML (or another suitable language) and then communicated to the EAI framework 2002, such as via MQ. An example of the URL search string as converted into XML is demonstrated in FIG. 22. A reply XML is created or generated in the EAI framework 2002 at step 2026 (an example of the XML reply is shown in FIG. 23). At step 2028, a transformation is selected and executed on the reply XML (an example of which is shown in FIG. 24) and HTML may be generated (an example of which is shown in FIG. 25). At step 2030, JavaScript files may be appended (as shown in FIG. 26) and DHTML may be communicated back to the customer or channel 2004 through the communication media or protocol 2008 (see example screen shown in FIG. 27).

Those skilled in the art will appreciate that the EAI framework of the embodiments of the invention reduce or eliminate the need to rewrite programming or duplicate data into different distributed applications. A core system of financial systems, for example, such as trust systems, CIF systems, customer information systems, and many others can be maintained and accessed through a mainframe system. The EAI framework provides an enterprise service bus which can translate XML, MQ, HTTP, delimited format, and data translations, while insulating or securing data from a distributed application server system. Embodiments of the invention therefore leverage the benefits of power, control and security which arise from using a mainframe system in contrast to excessive use of distributed application servers, while also promoting a significant browser-based experience for customers or channels that access the mainframe system.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, components of the mainframe-based systems described herein may vary based on business requirements: EAI parsing algorithms can be called from both batch and on-line programs and are configurable; EAI tagging algorithms can be called from both batch and on-line programs and are configurable; routing rules are configurable; URLs are configurable; both synchronized and non-synchronized messages can be supported; and SOAP messages can be communicated to allow and facilitate web services communication.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium. Such a medium may include any of the forms listed above with respect to storage devices and may further include, for example, a carrier wave modulated, or otherwise manipulated, to convey instructions that may be read, demodulated/decoded and executed by a computer.

It can also be appreciated that certain process aspects described herein may be performed using instructions stored on a computer-readable medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. A "computer-readable propagation medium" may involve one or more data signals transmitted on one or more carrier waves.

A "computer" or "computer system" may be, for example, a wireless or wire line variety of a microcomputer, minicomputer, server, mainframe, laptop, personal data assistant (PDA), wireless e-mail device (e.g., "BlackBerry" trade-designated devices), phone, smart phone, cellular phone, cable box, pager, processor, fax machine, scanner, or any programmable device configured to transmit and receive data over a network. Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media.

In various embodiments of the present invention disclosed herein, a single component may be replaced by multiple components, and multiple components may be replaced by a single component, to perform a given function or functions. Except where such substitution would not be operative to practice embodiments of the present invention, such substitution is within the scope of the present invention.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A system for building configurable applications, the system comprising:
    a distributed tier including at least one computer processor programmed for executing at least one module, the distributed tier further comprising:
        (i) a presentation module accessible by a user, the presentation module being configured to permit configuration of an interface in a session with the user, the session generating state data including at least one indication of a modification to the interface, and,
        (ii) an interface module configured to process at least a portion of the state data in an extensible language format to generate extensible language formatted state data, wherein the interface module is configured to route a constructed application from the presentation module to a business process management system for seeking approval of the constructed application by an operational area of an institution;
    a mainframe system including at least one computer processor, the mainframe system further comprising:
        (i) an enterprise architecture integration (EAI) framework configured for receiving the extensible language formatted state data and invoking at least one service in association with evaluating the extensible language formatted state data, and
        (ii) a business rules engine having at least one rule based on an extensible language format, the business rules engine being accessible by the EAI framework in association with evaluating the state data to generate evaluated state data, wherein the business rules engine further comprises at least one configurable screen definition, and,
        (iii) a business rules engine builder accessing the business rules engine and permitting selection from among different rules collections in the business rules engine and modification of the at least one rule based on a selection of the at least one configurable screen definition; and,
    the mainframe system being configured to translate the evaluated state data into a reply message based on an extensible language format.

2. The system of claim 1, further comprising the interface module being configured for MQ abstraction in association with communicating data to the mainframe system.

3. The system of claim 1, further comprising an MQ hub for processing data communicated between the distributed tier and the mainframe system.

4. The system of claim 1, further comprising the EAI framework being configured to serve as at least one of an MQ connector, an extensible markup language (XML) generator, an XML translator, or a field level data validator for data communicated to or from the mainframe system.

5. The system of claim 1, further comprising the EAI framework being configured for communication with at least one external data source.

6. The system of claim 1, wherein the reply message includes data associated with a blank presentation template.

7. The system of claim 1, wherein the reply message includes data associated with a presentation configured based on existing state data.

8. The system of claim 1, further comprising the business rules engine being configured with at least one of a before-rule or an after-rule.

9. The system of claim 1, further comprising the distributed tier being configured to perform an XSLT transformation on the reply message received from the mainframe system.

10. The system of claim 9, further comprising the distributed tier being configured to convert the transformed replay message into a protocol viewable by a browser.

11. A method for building configurable applications, the method comprising:
    facilitating access to a presentation module by a user, the presentation module being configured to permit configuration of an interface in a session with the user, the session generating state data including at least one indication of a modification to the interface;
processing at least a portion of the state data including at least one configurable screen definition in an extensible language format to generate extensible language formatted state data;
receiving the extensible language formatted state data in an enterprise architecture integration framework (EAI) of a mainframe system;
invoking at least one service in association with evaluating the extensible language formatted state data;
triggering at least one rule, stored in a business rules engine, in association with the invoked EAI service for evaluating the extensible language formatted state data, the at least one rule being based on an extensible language format;
permitting, by a business rules engine builder accessing the business rules engine, selection from among different rules collections in the business rules engine and modification of the at least one rule based on a selection of the at least one configurable screen definition;
translating the evaluated state data into a reply message based on an extensible language format; and,
routing the state data including at least one indication of a modification to the interface from the presentation module to a business process management system for seeking approval of the constructed application by an operational area of an institution.

12. The method of claim 11, further comprising receiving data communicated from at least one external data source.

13. The method of claim 11, wherein the reply message includes data associated with a blank presentation template.

14. The method of claim 11, wherein the reply message includes data associated with a presentation configured based on existing state data.

15. The method of claim 11, further comprising performing an XSLT transformation on the reply message generated by the mainframe system.

16. The method of claim 15, further comprising converting the transformed replay message into a protocol viewable by a browser.

* * * * *